(12) United States Patent
Hinderer et al.

(10) Patent No.: US 10,042,807 B2
(45) Date of Patent: Aug. 7, 2018

(54) DIFFERENTIAL BUS RECEIVER WITH FOUR-QUADRANT INPUT CIRCUIT

(71) Applicant: Infineon Technologies AG, Neubiberg (DE)

(72) Inventors: Thorsten Hinderer, Neubiberg (DE); David Astrom, Feffernitz (AT); Eric Pihet, Munich (DE)

(73) Assignee: Infineon Technologies AG, Neubiberg (DE)

( * ) Notice: Subject to any disclaimer, the term of this patent is extended or adjusted under 35 U.S.C. 154(b) by 141 days.

(21) Appl. No.: 15/091,337

(22) Filed: Apr. 5, 2016

(65) Prior Publication Data
US 2017/0286347 A1 Oct. 5, 2017

(51) Int. Cl.
| G06F 13/20 | (2006.01) |
| G06F 13/40 | (2006.01) |
| G06F 1/26 | (2006.01) |
| G06F 1/32 | (2006.01) |
| G06F 13/42 | (2006.01) |

(52) U.S. Cl.
CPC .......... *G06F 13/4072* (2013.01); *G06F 1/266* (2013.01); *G06F 1/3296* (2013.01); *G06F 13/4086* (2013.01); *G06F 13/4282* (2013.01)

(58) Field of Classification Search
CPC ............. G06F 13/4072; G06F 13/4086; G06F 1/3296; G06F 13/4282; G06F 1/266
See application file for complete search history.

(56) References Cited

U.S. PATENT DOCUMENTS

| 3,838,262 A * | 9/1974 | van de Plassche ...... G06G 7/16 323/317 |
| 5,357,188 A * | 10/1994 | Takeda .................... G05F 3/265 323/315 |
| 5,602,504 A * | 2/1997 | Liu ......................... G06G 7/163 327/100 |
| 6,084,460 A * | 7/2000 | Takeuchi ............... G06G 7/163 327/357 |
| 6,324,044 B1 * | 11/2001 | Teggatz ................ G06F 13/385 327/379 |
| 7,242,227 B2 * | 7/2007 | Pauletti ............... H04L 25/0284 327/112 |
| 9,749,004 B2 * | 8/2017 | Lien ....................... H04B 1/525 |

(Continued)

FOREIGN PATENT DOCUMENTS

DE 2335945 A1 2/1974

OTHER PUBLICATIONS

"How to Bias an OP-AMP", MAS.836 Sensor Technologies for Interactive Environments, MIT OpenCourseWare http://ocw.mit.edu, Spring 2011.*

(Continued)

*Primary Examiner* — Jing-Yih Shyu
(74) *Attorney, Agent, or Firm* — Shumaker & Sieffert, P.A.

(57) ABSTRACT

Systems, devices, methods, and techniques for bus receivers operable to provide a data output corresponding to a voltage differential provided on a two-conductor data bus. In one example, a bus receiver comprises a four-quadrant input circuit and a gain stage coupled to the four-quadrant input circuit. In various examples, the four-quadrant input circuit is operable to provide common mode current compensation based on a common mode voltage present on the two-conductor data bus.

19 Claims, 12 Drawing Sheets

(56) References Cited

U.S. PATENT DOCUMENTS

| | | | |
|---|---|---|---|
| 2003/0145121 A1* | 7/2003 | Watkins | G06F 13/385 |
| | | | 709/250 |
| 2006/0066393 A1* | 3/2006 | Davis | H03K 19/018528 |
| | | | 327/563 |
| 2007/0217548 A1* | 9/2007 | Berckmans | H04L 12/40013 |
| | | | 375/317 |
| 2011/0022766 A1* | 1/2011 | Beckmann | H04L 12/40032 |
| | | | 710/305 |
| 2011/0121881 A1* | 5/2011 | Feng | H03D 7/1433 |
| | | | 327/357 |
| 2014/0156893 A1* | 6/2014 | Monroe | G06F 13/372 |
| | | | 710/117 |
| 2017/0063354 A1* | 3/2017 | Chang | H03K 5/01 |

OTHER PUBLICATIONS

"Current sources and sinks" from Wikipedia, https://en.wikipedia.org/wiki/Current_sources_and_sinks.*

"Bias Voltage and Current Sense Circuits for Avalanche Photodiodes" by Jim Williams, Linear Technology Corporation, Nov. 2002.*

"Road vehicles—Controller area network (CAN)—Part 2: High-speed medium access unit," ISO/DIS 11898-2:2015(E), Dec. 17, 2015, 34 pp.

Office Action, in the German language, from counterpart German Application No. 102017107329.9, dated Apr. 18, 2018, 6 pp.

* cited by examiner

DIFFERENTIAL BUS RECEIVER WITH FOUR-QUADRANT INPUT CIRCUIT

TECHNICAL FIELD

This disclosure relates to two-conductor electrical communication systems and techniques, and in particular, to receiver circuits and methods of receiving data transmissions from communications systems utilizing a two-conductor bus structure.

BACKGROUND

In various communication and computer systems, serial communications are used to transmit data over a communications bus. In a serial communication system, data is transmitted one bit at a time in sequence onto the communications bus, and the transmitted data is then received in the same sequence by one or more devices coupled to the communications bus. There are many different standards and protocols available for use in serial communications systems.

As an example of a serial bus communication protocol, "Controlled Area Network" (abbreviated "CAN") is a standard directed to a serial bus system that can be used to connect microcontrollers, sensors, and actuators in real-time control applications. A version of a CAN protocol is High Speed CAN (abbreviated "HS-CAN"), and is directed to a communication system based on two-conductor differential network. In various examples, the two-conductor differential network includes a twisted-pair cable as the bus.

Devices coupled to the two-conductor CAN network or the HS-CAN network are referred to as CAN nodes. A CAN system requires at least two CAN nodes to be coupled to the CAN network. Data is communicated on the CAN or HS-CAN bus by providing two different levels of a voltage differential between the two conductors of the CAN bus, the two conductors referred to as the CAN High line and the CAN Low line. In various examples, CAN bus and HS-CAN bus are considered to be a non-return-to-zero (NRZ) bus system. A first differential voltage level provided between the CAN High line and the CAN Low line represents a first data state or data bit, referred to as the "RECESSIVE" state, and is representative of a logic "1," and a second differential voltage level, different from the first differential voltage level and referred to as the "DOMINANT" state, is representative of a logic "0". In various examples, communication protocols used in CAN bus communications, referred to as "CAN-FD" allow for data transmission rates up to 5 Mbits/second.

SUMMARY

In one example, the disclosure is directed to a device comprising: a bus receiver comprising a four-quadrant input circuit, the four-quadrant input circuit including a first current input, a second current input, and a common mode current input, wherein the four-quadrant input circuit is configured to receive a first current at the first current input, receive a second current at the second input, and receive a common mode current at the common mode current input, compensate the first current and the second current based on the common mode current, output a first differential voltage based on a difference in current flows between the first current and the second current compensated for the common mode current, and output a second differential voltage based on the difference in current flows between the first current and the second current compensated for the common mode current; and a gain stage coupled to the four-quadrant input circuit, wherein the gain stage is configured to receive the first differential voltage and the second differential voltage, generate a first current output based on the first differential voltage, generate a second current output based on the second differential voltage, and output a summed current comprising the first current output and the second current output.

In another example, the disclosure is directed to a method comprising receiving a first input current, a second input current, and a common mode current at a bus receiver including a four-quadrant input circuit, compensating, using the four-quadrant input circuit, the first input current and the second input current based on the received common mode current, generating as an output from the four-quadrant input circuit a first differential voltage based on a difference in the current flows between the first input current and the second input current, generating as an output from the four-quadrant input circuit a second differential voltage based on the difference in the current flows between the first input current and the second input current, generating a first output current based on the first differential voltage, generating a second output current based on the second differential voltage generating, at a summed current output node as summed current output comprising the first output current and the second output current, wherein the summed current is representative of the difference in the current flows between the first input current and the second input current.

In another example, the disclosure is directed to system comprising: a bus receiver comprising a four-quadrant input circuit, the four-quadrant input circuit including a first current input and a second current input; wherein the four-quadrant input circuit is configured to receive a first current at the first current input, receive a second current at the second input, and output a first differential voltage and a second differential voltage based on a difference in current flows between the first current and the second current, the first differential voltage and the second differential voltage compensated for a common mode current; an active gain input stage coupled to the four-quadrant input circuit, the active gain input stage comprising a first input coupled to a voltage input differential circuit; a second input coupled to a biasing circuit operable to provide biasing to control biasing of a plurality of output semiconductors controlling a plurality of outputs of the four-quadrant input circuit; a first active gain stage output coupled to the common mode biasing circuit; and a second active gain stage output coupled to the common mode biasing circuit, wherein the active gain stage is operable to provide common mode current compensation by driving, using the first active gain output, the common mode biasing circuit to allow current to be provided to the first current input and the second current input when a negative common mode current exists between the first current input and the second current input; and provide common mode current compensation by driving, using the second active gain output, the common mode biasing circuit to allow current to be sunk from the first current input and from the second current input when a positive common mode current exists between the first current input and the second current input.

DETAILED DESCRIPTION

Figure 1:
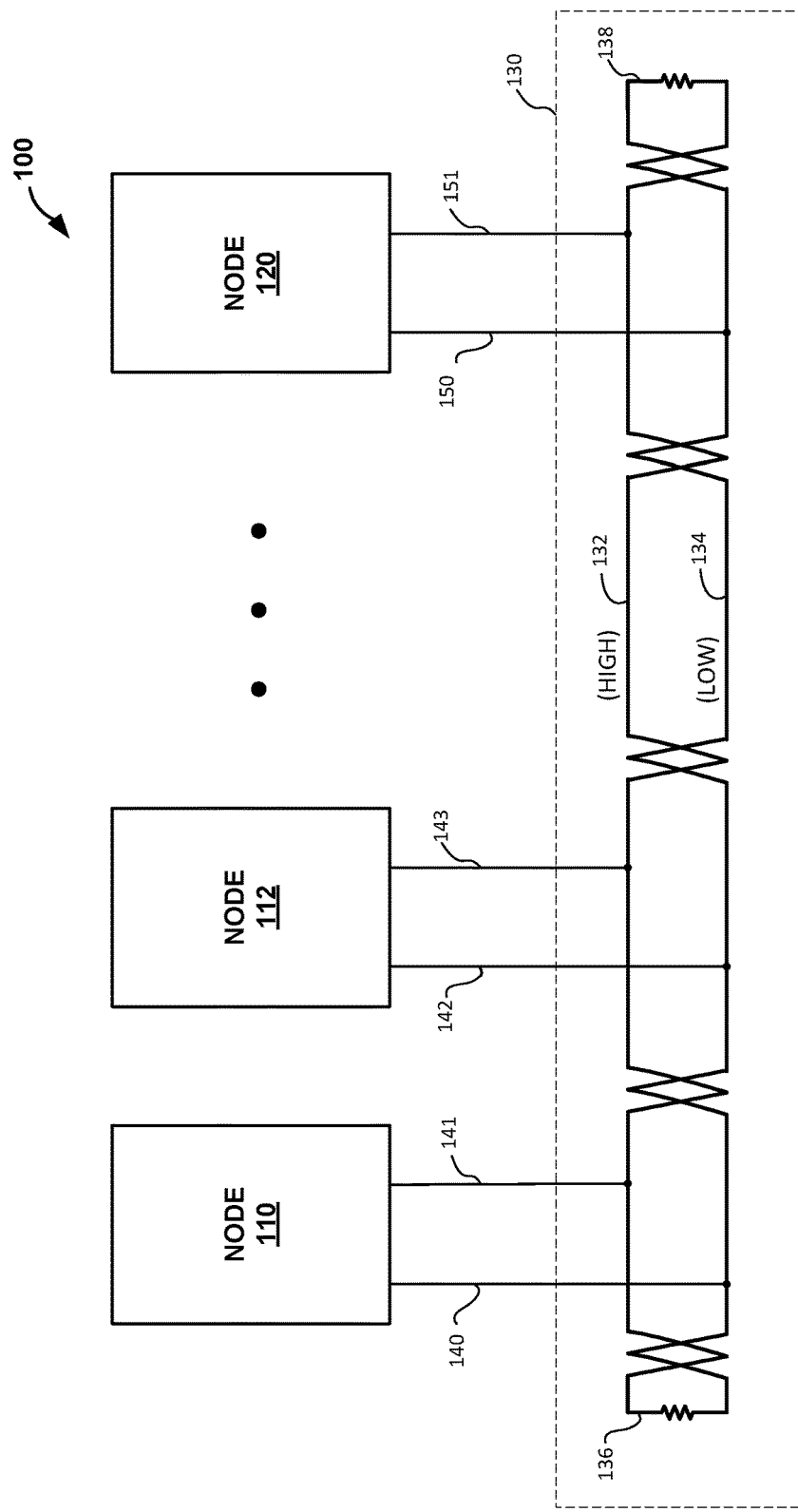
FIG. 1 is a block diagram illustrating an example communication system in accordance with one or more aspects of the present disclosure.

FIG. 1 is a block diagram illustrating an example communication system 100 in accordance with one or more aspects of the present disclosure. As illustrated, communication system 100 includes a bus 130 and a plurality of nodes 110, 112, through 120. In various examples, bus 130 is a High Speed CAN bus (HS-CAN). In various examples, bus 130 comprises a twisted-pair bus structure. However, bus 130 is not limited to any particular type of bus, and any bus structure incorporating a two-conductor bus structure can be represented as illustrated by bus 130.

In various examples, bus 130 includes a first conductor 132 (e.g., a wire), and a second conductor 134 (e.g., a wire), wherein first conductor 132 and second conductor 134 are separate conductors that are jointed at a first end in termination 136, and at a second end opposite the first end in termination 138. In various examples, terminations 136 and 138 are both comprised of a resistive load. In various examples, terminations 136 and 138 each comprise a 120 Ohm resistive load. It would be understood that other types of bus systems require different types of terminations, a different number of terminations, or in some instances do not require terminations, and in such systems termination 136 and termination 138 may or may not be present.

In examples where communication system 100 is a HS-CAN bus system, first conductor 132 is referred to as the CAN-H (High) conductor, and second conductor 134 is referred to as the CAN-L (Low) conductor, and nodes 110, 112, through 120 are referred to as CAN nodes. However, communication system 100 is not limited to nodes 110, 112, through 120 being CAN nodes, and nodes 110, 112, through 120 can be illustrative of any type of device that can be coupled to a bus system compliant with the communication system and signal transmission protocols for which bus 130 is designed to operate within.

As illustrated, each node 110, 112, and 120 has a first stub connector coupled to the first conductor 132, and a second stub connector coupled to the second conductor 134. Stub connector 140 is illustrative of a first stub connector coupling node 110 to the first conductor 134. Stub connector 141 is illustrative of a second stub connector coupling node 110 to the second connectors 132. Each node 112 through 120 is similarly coupled to bus 130 through a set of stub connectors (142, 143 for node 112, 150, 151 for node 120). In various examples, each stub connector is uniquely and separately coupled to a single one of the nodes coupled to bus 130 and to one and only one of conductors 132 or 134, and wherein stub connectors would not be shared by two or more nodes.

In various examples, bus 130 is a HS-CAN bus, and nodes 110, 112, and 120 are CAN nodes, but examples described herein are not limited to systems using a CAN or HS-CAN buses and CAN nodes. In various examples, one or more of nodes 110, 112, through 120 can receive data from the bus 130. In various examples, one or more of nodes 110, 112, through 120 are operable to send data through bus 130 to other nodes coupled to bus 130. In various examples, one or more of nodes 110, 112, through 120 are operable to both receive data from bus 130 and to transmit data through bus 130 to one or more other nodes coupled to bus 130. It would be understood that receiving data and transmitting data on bus 130 would be accomplished using data formats and based on one or more transmission signal protocol(s) applicable to the system and standards for the communication system 100 under which communication system 100 is designed to operate. For example, if system 100 is designed to be a HS-CAN bus system, data formats and transmissions made on bus 130 would be in conformance with the applicable standards designed for use in HS-CAN bus compliant systems. While reference is made throughout the application to HS-CAN bus systems, the subject matter of the present disclosure is not limited to CAN bus or HS-CAN bus systems, and the devices, system and methods described herein, and the equivalents thereof, can be applied in other types of communications systems, including but not limited to other types of communication systems including differential signaling systems.

Figure 2:
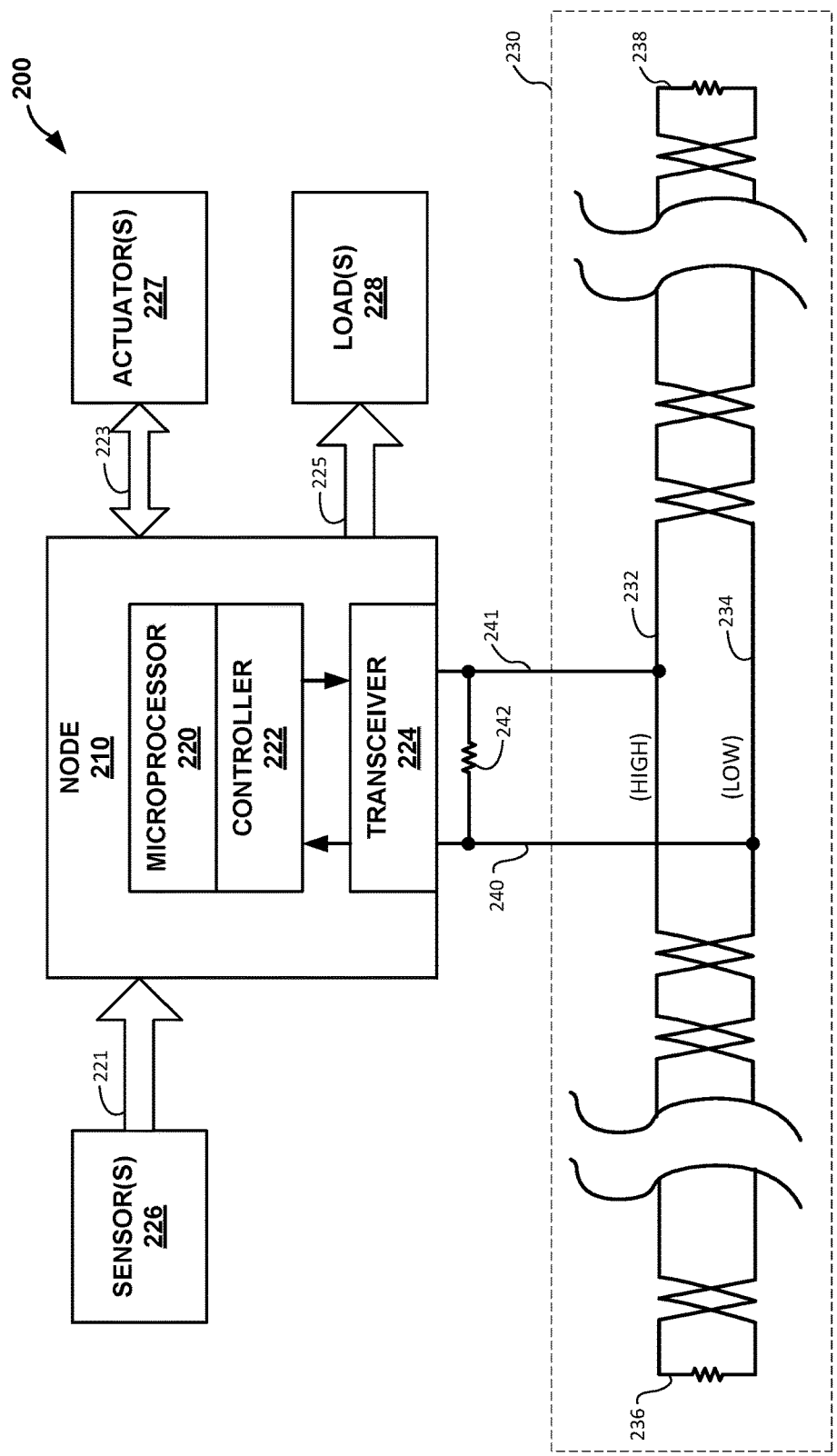
FIG. 2 is a block diagram illustrating a portion of an example communication system in accordance with one or more aspects of the present disclosure.

FIG. 2 is a block diagram illustrating a portion of an example communication system 200 in accordance with one or more aspects of the present disclosure. As illustrated, communication system 200 includes a bus 230 and a node 210. In various examples, bus 230 is a HS-CAN bus, although the examples of bus 230 are not limited to HS-CAN buses. In various examples, bus 230 comprises a twisted-pair cable, although examples of bus 230 are not limited to comprising twisted-pair cables. Bus 230 includes a first conductor 232 (e.g., a wire), and a second conductor 234 (e.g., a wire). In examples where communication system 200 is a HS-CAN bus system, first conductor 232 is referred to as the CAN-H (High) conductor, and second conductor 234 is referred to as the CAN-L (Low) conductor. In various examples, bus 230 also includes terminations (236, 238), and in various examples represents a portion of the bus 130 as shown in FIG. 1. In various examples, communication system 200 is a HS-CAN bus compliant system, and includes at least one additional CAN node (not shown), in order to comply with the requirement for having at least two nodes in a HS-CAN bus compliant system.

As illustrated in FIG. 2, communication system 200 includes node 210 coupled to bus 230. In various examples, node 210 is a CAN node, although examples of node 210 are not limited to CAN nodes. As illustrated, node 210 is coupled to bus 230 through stub connector 240 coupling node 210 to the second conductor 234, and stub connector 241 coupling node 210 to the first conductor 232. In various examples, node 210 includes a node termination 242. In various examples, termination 242 is operable to dampen or eliminate electrical signal ringing that might be present at stub connectors 240 and 241. In various examples, node termination couples stub connector 240 and stub connector 241 with a resistive load. In various examples, termination 242 has a resistive value that is different from the resistive value provided by terminations 236 and 238. In various examples, termination 242 has a resistive value in a range of 1,000 ohms to 10,000 ohms.

As illustrated in FIG. 2, node 210 includes a transceiver 224, a controller 222, and a microcontroller 220. In various examples, transceiver 224 is a CAN transceiver, controller 222 is a CAN controller, and are referred to as such herein, although examples are not limited to having a CAN transceiver or a CAN controller. As illustrated, CAN transceiver 224 couples node 210 to bus 230 through CAN-H conductor 232 and CAN-L conductor 234. In various examples, CAN transceiver 224 is operable to receive data from bus 230, and convert the data from CAN bus signal levels to one or more levels that can be used by CAN controller 222. In various examples, CAN transceiver 224 includes circuitry to protect CAN controller 222, for example from surges, overvoltage conditions, or other electrical problems that might be present on bus 230. In various examples, CAN transceiver 224 is operable to convert data received from CAN controller 222 into data signal levels that are acceptable for transmission on bus 230. In various examples, the CAN transceiver 224 is operable to convert data received from CAN controller 222 into data levels that are compliant with transmission protocols for data transmitted on a HS-CAN bus.

In various examples, CAN controller 222 is part of microcontroller 220, and form a single device. In other examples, CAN controller 222 is a separate device from microcontroller 220. In various examples, CAN controller 222 includes a CAN protocol handler that is operable to receive a data bit stream from CAN transceiver 224 and to buffer incoming messages until an entire message is received, wherein the entire message can then be operated on by microcontroller 220. In various examples, the CAN protocol handler is operable to receive messages from microcontroller 220, and to transmit to CAN transceiver 224 a stream of data bits from transmission by CAN transceiver 224 onto bus 230.

In various examples, microcontroller 220 runs applications or programs to process messages received from bus 230, and to generate messages to be transmitted onto bus 230. In various examples, microcontroller 220 is operable to determine if a message received from bus 230 was addressed to node 210, or was addressed to some node other than node 210. In various examples, one or more sensors, actuators, and other types of input and output devices, such as loads (generally illustrated by blocks 226, 227, 228), are coupled to and/or controlled by microcontroller 220. In various examples, microcontroller 220 executes instructions that receive inputs 221, 223 from the one or more devices 226 and 227. An example of a sensor is a temperature sensor providing temperature data to microcontroller. In various examples, microcontroller 220 provides outputs 223 that control the operation of one or more of these devices 227, or provides control of load(s) 228 coupled to microcontroller 220 through output signals 225. An example of an actuator is a stepper motor controlled by the microcontroller, and including a stepper motor encoder providing feedback to microcontroller 220 related to the stepper motor. An example of a load is an indicator lamp controlled by microcontroller 220. In various examples, node 210 represents one or more of nodes 110, 112, through 120 of FIG. 1.

Figure 3:
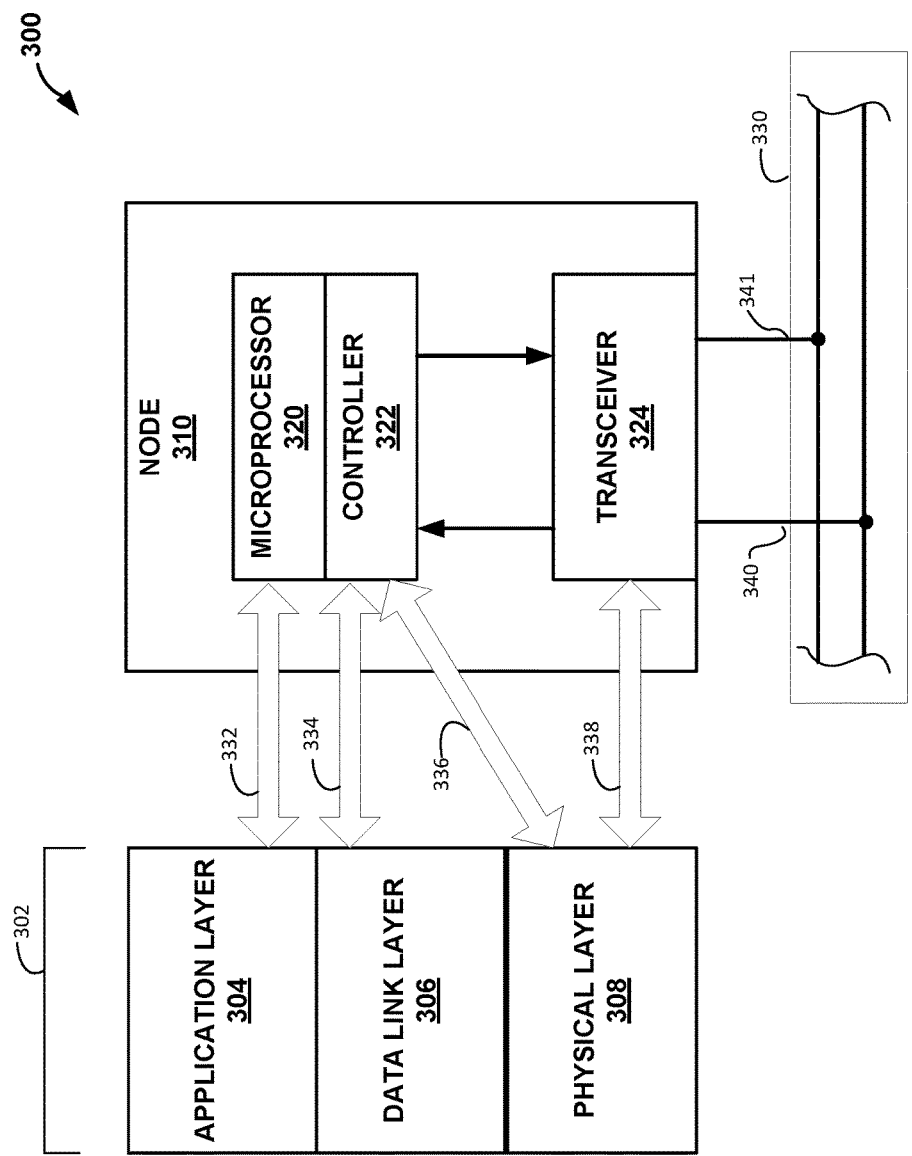
FIG. 3 illustrates a conceptual diagram of a protocol model in accordance with one or more example techniques described in this disclosure.

FIG. 3 illustrates a conceptual diagram of a protocol model 300 in accordance with one or more example techniques described in this disclosure. Protocol model 300 includes a conceptual layer diagram 302, and a corresponding diagram of node 310. Layer diagram 302 illustrates a conceptual model of the communication function layers that are utilized in various examples by the node 310 and bus 330 as depicted in FIG. 3. In various examples, protocol model 300 is based, at least in part, on the ISO seven layer model defined by the Open Systems Interconnection Project of the International Organization for Standardization (ISO). As illustrated, layer model 302 includes an application layer 304 as the top layer, a data link layer 306 below the application layer 304, and physical layer 308 below data link layer 306. In various examples, physical layer 308 provides services that include transmission and reception of data to and from a bus, respectively. In various examples, data link layer 306 performs services related to processing of messages received from the physical layer for access and use by the application layer, and processing of messages received from the application layer for transmission by the physical layer onto a bus. In various examples, application layer 304 performs high level processing, runs applications, processes incoming signals received from sensors and other devices, and determines settings and generates output control signals for actuators and other devices.

As illustrated, node diagram 310 includes a microcontroller 320 coupled to a controller 322, and a transceiver 324 coupled to controller 322. In various examples, microcontroller 320 and controller 322 are a single device. In other examples, microcontroller 320 and controller 322 are separate devices. In various examples, transceiver 324 is a CAN transceiver, and controller 322 is a CAN controller, although examples of node 310 are not limited to including a CAN transceiver and a CAN controller.

As illustrated, transceiver 324 is coupled to bus 330 through stub connectors 340 and 341. In various examples, messages from bus 330 are received by the transceiver 324 using the physical layer 308 protocols, as represented by arrow 338, and forwarded onto the controller 322 in the data link layer 306, and in some examples including physical layer 308. Once processed by controller 322 at the data link layer 306, as represented by arrows 334 and 336, these incoming messages are passed to microcontroller 320 for processing by microcontroller 320 at the application layer 304, as represented by arrow 332.

In addition, messages to be sent out from node 310 may be generated by microcontroller 320 at the application layer 304 as represented by arrow 332, and passed to controller 322 where the outgoing messages are processed at the data link layer 306 by controller 322, as represented by arrow 334. Some processing at the controller 322 can also include use of physical layer 308 protocols, as represented by arrow 336. Once processed by the controller 322, the messages are passed to transceiver 324 and processed at the physical layer 308, as represented by arrow 338, and transmitted at the physical layer 308 onto bus 330.

In various examples, node 310 is representative of any one or more of nodes 110, 112, through 120 in FIG. 1, or node 210 in FIG. 2. In various examples, microcontroller 330 is representative of microcontroller 220 as shown in FIG. 2. In various examples, controller 322 is representative of controller 222 in FIG. 2. In various examples, transceiver 324 is representative of transceiver 224 in FIG. 2. In various examples, bus 330 is representative of bus 130 in FIG. 1, or bus 230 in FIG. 2.

Figure 4:
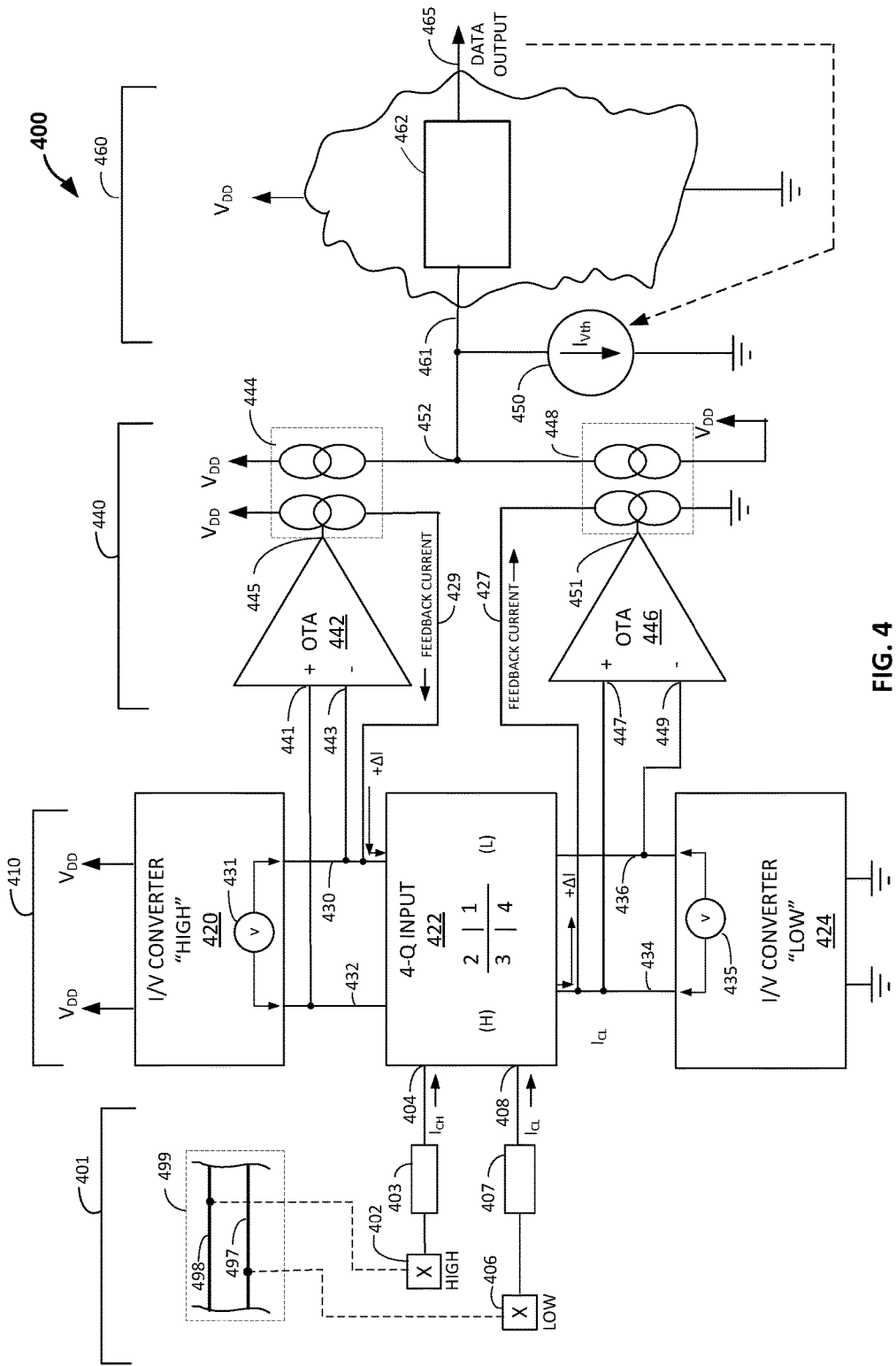
FIG. 4 is a schematic diagram illustrating a bus receiver system in accordance with one or more aspects of the present disclosure.

FIG. 4 is a schematic diagram illustrating a bus receiver system 400 in accordance with one or more aspects of the present disclosure. The bus receiver system 400 as described herein represents one or more examples of a receiver system that can be used as a receiver located in a node, such as one or more of nodes 110, 112, through 120 as shown in the system 100 of FIG. 1, and as the receiver included in the transceiver 224 of node 210 as shown in system 200 of FIG. 2, and as the receiver included in transceiver 324 of node 310 as show in FIG. 3. It would be understood that various examples of bus receiver system 400 could be used as a receiver in various systems having nodes coupled to a bus system, and is not limited to the examples illustrated by system 100, system 200, or node 310 as described herein.

As illustrated in FIG. 4, system 400 includes an input stage 410 coupled to a gain stage 440. In various examples, input stage 410 includes a four-quadrant input circuit 422 having a first input 404, a second input 408, a first output 430, a second output 432, a third output 434, and a fourth output 436. In various examples, four-quadrant input circuit 422 is coupled to a bus 499 through an input coupling circuit 401. Input coupling circuit 401 includes a first input 402 operable to be coupled to a first conductor 498 of bus 499, and a second input 406 operable to be coupled to a second conductor 497 of bus 499. As illustrated, first input 402 is coupled to first input 404 of the four-quadrant input circuit 422 through resistive load 403, and second input 406 is coupled to the second input 408 of four-quadrant input circuit 422 through resistive load 407. In various examples, input coupling circuit 401 couples the four-quadrant input circuit 422 to a CAN-bus or a HS-CAN bus, wherein first input 402 is coupled to the CAN-High conductor 498, and second input 406 is coupled to the CAN-Low conductor 497 of bus 499. However, examples of the bus 499 to which input coupling circuit 401 is operable to be coupled to are not limited to a CAN-bus or to a HS-CAN bus, and can include various types of buses having two-conductors forming the bus structure.

As illustrated, four-quadrant input circuit 422 is coupled to current-to-voltage (I/V) converter 420 through first output 430 and second output 432. Converter 420 is coupled to voltage supply $V_{DD}$, and is referred to as the "HIGH" converter. In various examples, first output 430 operates as a current sink, sinking current that is provided from converter 420 to first output 430, and second output 432 operates as a current sink, sinking current that is provided by converter 420. In various examples, based on the current flows to first output 430 and to second output 432, the "HIGH" converter 420 is operable to generate a voltage differential 431 between first output 430 and second output 432. In various examples, voltage differential 431 is maintained at substantially a zero volt differential based on the current input level of ($I_{CH}$) received at input 404, the current input level of ($I_{CL}$) received at input 408, and a feedback current level provided by current feedback 429, as further described below.

As illustrated, four-quadrant input circuit 422 is also coupled to current-to-voltage (I/V) converter 424 through third output 434 and fourth output 436. Converter 424 is coupled to ground, and is referred to as the "LOW" converter. In various examples, third output 434 operates as a current source, sourcing current that is provided to converter 424 from third output 434, and fourth output 436 operates as a current source, sourcing current that is provided to converter 424 from fourth output 436. In various examples, based on the current flows from third output 434 and from fourth output 436, the "LOW" converter 424 is operable to generate a voltage differential 435 between third output 434 and fourth output 436. In various examples, voltage differential 435 is maintained at substantially a zero volt differential based on the current input level of ($I_{CH}$) received at input 404, the current input level of ($I_{CL}$) received at input 408, and a feedback current level provided by current feedback 427, as further described below.

In various examples, four-quadrant input circuit 422 couples first output 430, input 408 of the four-quadrant input circuit 422, and forth output 436 together as the "LOW" (L) side of circuit 422, and couples second output 432, input 404 of the four-quadrant input circuit 422, and third output 434 as the "HIGH" (H) side of circuit 422. In this configuration, a current flow from "HIGH" converter 420 provided to first output 430 is combined with the current input ($I_{CL}$) provided at input 408, and is provided as a current output at fourth output 436. The current input provided by first output 430 includes any additional current added by current feedback 429. Further, a current flow from "HIGH" converter 420 provided to second output 432 is combined with the current input ($I_{CH}$) provided at input 404, and is provided as a current output at third output 434. The current input provided from third output 434 includes any current pulled away (sunk) by current feedback 427.

In various examples, gain stage 440 includes a first amplifier 442 and a second amplifier 446. In various examples, first amplifier 442 and second amplifier 446 are Operational Transconductance Amplifiers (OTAs). OTAs are amplifiers that provide a current controlled output based on a voltage difference provided to the inputs of the OTA and a transconductance "$g_m$" of the amplifier. In effect, an OTA is a voltage controlled current source, wherein the output current provided by the OTA is controlled by the voltage differential provided between the inputs to the OTA. As illustrated, first amplifier 442 includes a non-inverting input 441 that is coupled to second output 432, an inverting input 443 that is coupled to first output 430, and an output 445. In various examples, based on the difference in the voltages received at non-inverting input 441 and inverting input 443, first amplifier 442 is operable to provide an output current at output 445. As illustrated in system 400, the difference in voltages received at non-inverting input 441 and inverting input 443 of first amplifier 442 is the voltage differential 431 generated by "HIGH" converter 420. Output 445 includes a current mirror 444 that provides a first current output 429 that is coupled as feedback current to first output 430, and a second current output that is coupled to output node 452. The coupling from the first current source of current mirror 444 to first output 430 provides current feedback (429) that functions to compensate for any current differential present at input 404 and 408 of four-quadrant input circuit 422.

Similarly, second amplifier 446 has a non-inverting input 447 that is coupled to third output 434, an inverting input 449 that is coupled to fourth output 436, and an output 451. Based on the difference in the voltages received at non-inverting input 447 and inverting input 449, the second amplifier 446 is operable to provide an output current at output 451. As illustrated in system 400, the difference in voltage received at non-inverting input 447 and inverting input 449 of second amplifier 446 is voltage differential 435 generated by "LOW" converter 424. Output 451 includes a current mirror 448 that provides a first current output 427 that is coupled as a path to sink current from third output 434, and a second current output that is coupled to output node 452. The coupling from the first current source of current mirror 448 to third output 434 provides a current sink that functions to compensate for any current differential present at input 404 and 408 of four-quadrant input circuit 422.

In various examples, current mirror 444 of first amplifier 442 is coupled to supply voltage $V_{DD}$, and is operable to act as a current source to provide current to output node 452. In various examples, current mirror 448 of second amplifier 446 is also coupled to supply voltage $V_{DD}$, and is operable to act as a current source to provide current to output node 452. As such, output node 452 sees a current flow that is representative of the summed currents provided at any given time by the outputs of current mirror 444 and current mirror 448 that are coupled to output node 452.

In various examples, a current source 450 ($I_{VTH}$) is coupled to output node 452 and to ground. In various examples, current source 450 is operable to sink current provided at output node 452 to ground. In various examples, current source 450 is operation to sink an amount of current provided at output node 452 up to a maximum threshold current amount. If the amount of current provided to output node 452 is less than the threshold current amount, current source 450 will sink the entire flow of current provided at output node 452 to ground. If the amount of current provided to output node 452 exceeds the threshold current amount, current source 450 is operable to continue to sink only the threshold current amount to ground, wherein any amount of current provided to output node 452 in excess of the threshold current amount will not be sunk through current source 450, and any such excess current will be provided as an output current flow to input 461 of gain stage 460.

In various examples, current source 450 includes hysteresis, wherein current source 450 is operable to provide a first threshold for a maximum amount of current that will be sunk to ground when the amount of current provided to output node 452 is increasing from an amount that is less than the first threshold level to a level that exceeds the first threshold level. A second threshold for a maximum level of current that will be sunk to ground by current source 450 is provided when the amount of current provided to output node 452 has exceeded the first threshold level and the second threshold level, but is now decreasing to a level that is below the second threshold level. In various examples, a threshold value for the second threshold level is less than a threshold value for the first threshold level. In various examples, current source 450 is operable to switch from using the first threshold level to using the second threshold level based on feedback regarding the voltage level being provided at data output 465, as further described below.

By sinking any level of current below a threshold value, (or below a first threshold value and then a second threshold value if hysteresis is applied), and not sinking any current levels that exceed the threshold value (or values if hysteresis is applied), current source 450 operates as current control mechanism by either providing current or not providing current from output node 452 to a next stage, such as but not limited to gain stage 460, based on the level of current provided to output node 452 by first amplifier 442 and second amplifier 446.

In various examples, output node 452 is coupled to I/V gain stage 460. In various examples, I/V gain stage 460 includes an input 461 coupled to device 462, and a data output 465 coupled to device 462. Input 461 is also coupled to output node 452, and is operable to receive a current flow from output node 452. In various examples, I/V gain stage 460 is operable to convert the current flows received at input 461 into a corresponding voltage level, and to output the voltage level as "data" at data output 465. In various examples, I/V gain stage 460 is coupled to voltage supply $V_{DD}$ and ground, and provides a high input impedance at input 461 to minimize the influence of I/V gain stage 460 on the current flows at output node 452, while providing a low impedance output level at data output 465. In various examples, device 462 is a buffer arranged in order to provide high input impedance and fast switching speed for gain stage 460, and to provide a driver for data output 465. In various examples, device 462 is a Complementary Metal-Oxide Semiconductor (CMOS) buffer circuit. In various examples, device 462 is a CMOS inverter circuit. In various examples, device 462 is operable to provide a voltage gain between the voltage levels provided to input 461 and data output 465. In various examples, the voltage gain provided by device 462 is greater than one. However, device 462 is not limited to a particular type of device or circuit, and can comprise any device or circuit operable to receive a current input from input 461 and to provide a voltage level output to data output 465 based on the current input. In various examples, the voltage level output provided to data output 465 comprise voltage levels compatible with switching voltage levels for CMOS devices.

In various examples, data output 465 is operable to be coupled to a controller, such as controller 222 in FIG. 2, or controller 322 in FIG. 3, and is operable to provide a signal to the controller, the signal provided to the controller representative of the data that being provided by the bus coupled to system 400 at inputs 402 and 406. In various examples, gain stage 460 is operable to provide the data output signal in compliance with voltage levels requirements and other transmission signal requirements needed by the downstream controller to properly further process the incoming data being provided at inputs 402 and 406 via bus 499.

In operation, voltage differences present on bus 499 between bus conductors 497 and 498 are converted to current inputs to four-quadrant input circuit 422 through resistive loads 403 and 407. In various examples, varying voltage levels are provided by the bus 499 representative of data signals. For example, a first data state, for example a data bit having a first value, can be represented by a voltage differential between conductors 497 and 498 that is near zero, or a very small voltage difference that is below some defined threshold voltage difference. A second data state, for example a different data bit having a second value different from the data bit having the first value, can be represented by a voltage differential between conductors 497 and 498 that exceeds a minimum threshold voltage level for a voltage differential value. In various examples, the first data state is represented by a voltage differential that is less than a maximum differential voltage level used to define a "RECESSIVE" state for a CAN-bus or HS-CAN bus, and the second data state is represented by a voltage differential that exceeds the minimum differential voltage level required to define a "DOMINANT" state for a CAN-bus or a HS-CAN bus, although examples are not limited to these particular voltage differential ranges to define a first data state and a second data state.

The voltage levels present on bus 499 are received at inputs 402 and 406, and are coupled to input 404 through resistive load 403 and to input 408 through resistive load 407, respectively, of circuit four-quadrant input 422. The variations in the voltage levels on bus 499 are provided as variations in current inputs at input 404 and input 408 of circuit 422. A difference in the level of current received at input 404 and the level of current received at input 408 of four-quadrant input circuit 422 controls the current flows provided and received by first output 430, second output 432, third output 434, and fourth output 436.

In various examples, a first data state represented on bus 499 when the voltage difference between conductors 497 and 498 of bus 499, (and thus between input 402 and 404 of the input coupling stage 401) is substantially zero, or below a pre-determined threshold voltage, the difference in current $I_{CH}$ provided at input 404 and the current $I_{CL}$ provided at input 408 is substantially zero or relatively small. The current input $I_{CH}$ provided at input 404 controls the current flow from "HIGH" converter 420 provided to second output 432, through circuit 422, and output through third output 434 to "LOW" converter 424, representative of the HIGH side (H) of circuit 422. The current input $I_{CL}$ provided at input 408 controls the current flow from "HIGH" converter 420 provided to first output 430, through circuit 422, and output through fourth output 436 to "LOW" converter 424, representative of the LOW side (L) of circuit 422. Because the voltage difference between conductors 497 and 498 of bus 499 is substantially zero, input currents $I_{CH}$ and $I_{CL}$ are also substantially the same current levels. As a result, the current flows through the HIGH side (H) and the LOW side (L) of circuit 422 are substantially equal. The resulting equal current flows through HIGH side (H) and LOW side (L) of circuit 422 cause a substantially zero voltage differential to be generated by voltage differential 431 and voltage differential 435. The substantially zero voltage level at voltage differential 431 is provided to first amplifier 422, resulting in amplifier 442 providing no current output to output node 452. The substantially zero voltage level at voltage differential 435 is provided to second amplifier 446, resulting in amplifier 446 providing no current output to output node 452.

Further, any tiny current differential present between input 404 and input 408 when bus 499 is providing the first data state will be compensated for by the feedback currents 429 and 427 provided by first amplifier 442 and second amplifier 446, respectively. First amplifier 442 is operable to drive the voltage differential 431 to substantially zero volt regardless of the difference in current flows provided at input 404 and 408 of circuit 422 by adding a feedback current 429 to first output 430 that drives voltage differential 431 to substantially zero volts. Therefore, if a current difference between $I_{CH}$ provided at input 404 and $I_{CL}$ provided at input 408 exists, first amplifier 442 provides a feedback current 429 that compensates current flow into first output 430, and thus drives voltage differential 431 back to a level of substantially zero volts. Similarly, second amplifier 446 is operable to drive the voltage differential 435 to substantially zero volts regardless of the difference in current flows provided at input 404 and 408 of circuit 422 by sinking a feedback current 427 from third output 434, which drives voltage differential 435 to substantially zero volts. Therefore, if a current difference between $I_{CH}$ provided at input 404 and $I_{CL}$ provided at input 408 exists, second amplifier 446 sinks a feedback current 427 that compensates current flow from third output 434, and thus driving voltage differential 435 back to a level of substantially zero volts.

As a result, when bus 499 is in this first data state, first amplifier 442 and second amplifier 446 provide substantially no current flow to output node 452. This substantially zero or relatively small value is a current level that is below the threshold current level of current source 450, and thus current source 450 sinks any current provided to output node 452 when this first data state is provide on bus 499. In addition, current source 450 will sink current provided to output node 452 by the gain stage 460, and thus lowers the voltage level at input 461 of gain stage 460 to substantially zero volts. As a result, input 461 of gain stage 460 receives no current flow to input 461, and provides a voltage output level at data output 465 that is indicative of the first data state present on bus 499 through device 462. In various examples, the output voltage level provided at data output 465 when bus 499 provides the first data state is substantially zero volts. In various examples, device 462 includes an inverter circuit operable to provide a voltage level, such as +5 volts, when node 452 is providing no current flow to input 461. Examples are not limited to data output 465 providing substantially zero volts or a +5 volt output when bus 499 is providing voltage levels indicative of the first data state, and in various examples, data output 465 provides a voltage level in a range that is indicative of the first data state being provided on bus 499 when no current flow is being provided to input 461.

In various examples, bus 499 is also operable to provide a voltage differential between conductors 497 and 498 that is indicative of a second data state. In such instances, the voltage difference between conductors 497 and 498 of bus 499 increases to a level that exceeds a minimum threshold differential voltage level, the voltage difference representative of a second data state, the second data representative of a data state different from the first data state. The second data state can be represented on bus 499 when the voltage difference between conductors 497 and 498 of bus 499, (and thus between input 402 and 406 of the input coupling stage 401) exceeds a minimum threshold differential voltage level. This voltage difference between input 402 and input 406 results in a difference in current $I_{CH}$ provided at input 404 and a current $I_{CL}$ provided at input 408 of four-quadrant input circuit 422. In various examples, the voltage level provided by conductor 498 when bus 499 is providing the second data state is higher than the voltage level provided by conductor 498 when bus 499 is providing the first data state, resulting in a current input level for IC at input 404 that is larger than the current input level for $I_{CH}$ at input 404 when bus 499 is in the first data state. This increased current input level at $I_{CH}$ results in a higher current flow through the HIGH side (H) of circuit 422, increasing the current output at third output 434. In addition, in this example when a voltage differential between conductor 497 and 498 is being provided by bus 499 that is indicative of a second data state, the voltage level provided by conductor 497 is different from a voltage level provided by conductor 497 when bus 499 is providing voltage levels representative of the first data state. In various examples, the voltage level provided by conductor 497 when bus 499 is providing the second data state is lower than the voltage level provided by conductor 497 when bus 499 is providing the first data state, resulting in a current input level for $I_{CL}$ at input 408 that is smaller than the current input level for $I_{CL}$ at input 408 when bus 499 is in the first data state. This decrease in the current input level at $I_{CL}$ results in a lower current flow through the LOW side (L) of circuit 422, decreasing the current output at fourth output 436.

This increase in current flow at third output 434 will result in a voltage difference at voltage differential 435 to increase between third output 434 and fourth output 436, resulting in a voltage differential 435 being provided to second amplifier 446. In various examples, second amplifier 446 is a high gain amplifier, and in response to this voltage differential, is operable to drive the voltage differential 435 back to substantially zero volts by sinking enough feedback current 427 from third output 434 to balance the current flow at third output 434 and fourth output 436 and thus drive the voltage difference at voltage differential 435 back to substantially zero volts, despite the change in current flow being provided at input 404 of circuit 422. As a result of the feedback current 427 being sunk by second amplifier 446, current mirror 448 provides a current flow from voltage supply $V_{DD}$ to output node 452. Further, the decrease in current flow from fourth output 436 will result in a voltage different at voltage differential 431 to increase between first output 430 and second output 432, resulting in a voltage differential 431 being provided to first amplifier 442. In various examples, first amplifier 442 is a high gain amplifier, and in response to this voltage differential, is operable to drive the voltage differential 431 back to substantially zero volts by sourcing enough feedback current 429 to first output 430 to balance the current flow at first output 430 and second output 432 to drive the voltage difference of voltage differential 431 back to substantially zero volts, despite the change in current flow being provided at input 408 of circuit 422. As a result of the feedback current 429 being source by first amplifier 442, current mirror 444 provides a current flow from voltage supply $V_{DD}$ to output node 452.

As a result, when bus 499 is providing a voltage differential representative of the second data state, first amplifier 442 and second amplifier 446 each provide a current flow to output node 452 that, when summed together at output node 452, provides a current level that is above the maximum amount of current that current source 450 is operable to sink to ground. Thus, when bus 499 is providing the second data state, the summed currents from first amplifier 442 and second amplifier 446 provide a current level that allows current source 450 to sink the threshold current level set for current source 450, and still provide additional current to output node 452, and thus to input 461, at a level that is indicative of the second data state being presented on bus 499. In various examples, the output current value provided by first amplifier 442 to output node 452 is less than the maximum (threshold) current level that can be sunk by current source 450, and the output current value provided by second amplifier 446 to output node 452 is also less than the maximum threshold current level that can be sunk by current source 450. However, the output current levels for the first amplifier 442 and the second amplifier 446 are each set to have a minimum current level output so that when these current outputs are summed together at output node 452, the summed current levels exceeds the maximum threshold current for current source 450 by an amount that provides an output current flow to input 461 at a level representative of the second data state.

Based on the excess current flow received from first amplifier 442 and second amplifier 446 above the threshold current level for current source 450, gain stage 460 converts the current flow provided by output node 452 into a voltage level, using device 462, that is indicative of the second data state, and provides the voltage level through device 462 as an output to data output 465. In various examples, the output voltage level provided at data output 465 when bus 499 provides the second data state is zero volts. Examples are not limited to data output 465 providing zero volts when bus 499 is indicate of the second data state, and in various examples, data output 465 provides a voltage level in a range that is indicative of the second data state being provided on bus 499.

In various examples, bus 499 is operable to switch from providing a differential voltage level between conductors 497 and 498 representative of the second data state and again provide a differential voltage level between conductors 497 and 498 that is representative of the first data state. Continuing with the examples discussed above, bus 499 would transition from providing the second data state to again providing the first data state by causing the differential voltage between conductors 497 and 498 to return to a near zero or a zero voltage level. As the transitions occurs, the voltage provided on conductor 497 rises, increasing the current provided to input 408 resulting in an increase in the current flow through the LOW side of circuit 422. At the same time, the voltage provided on conductor 498 is decreasing, decreasing the current provided to input 404, resulting in a decrease in the current flow through the HIGH side of circuit 422. This increase in current flow through the LOW side and the decrease in current flow through the HIGH side of circuit 422 results in a decreasingly smaller voltage differential being generated by both voltage differential 431 and voltage differential 435, resulting in less current being provided to output node 452 by first amplifier 442 and by second amplifier 446. At some point, the summed currents being provided to output node 452 is less than a threshold current level being sunk by current source 450, and at that point input 461 of gain stage 460 no longer receives a current flow from output node 452. As a result, output stage 460 is operable to, using device 462, switch the voltage level provided at data output 465 from a voltage level representative of the second data state to providing a voltage level representative of the first data state. As described above, current source 450 is operable to set a first threshold current level used as the switching point when system 400 is transition from providing a data output representative the first data state to providing a data output representative of the second data state, and to set a second threshold current level, different from the first threshold current level, as the switching point when system 400 is transition back from providing the data output representative of the second data state to providing the data output representative of the first data state. In various examples, the first threshold current level is representative of a voltage differential provided at inputs 402 and 406 which is larger than the voltage differential provided at input 402 and 406 represented by the set point for the second current threshold level.

Thus, examples of system 400 are operable to receive variations in a differential voltage level from a bus 499, and to convert these differential voltage levels into a data output comprising a first voltage level representative of a first data state, and second voltage level representative of a second data state.

Advantages of system 400 include that is composed of a simple 4-quadrant input stage combined with an active gain stage, generation of an output current corresponding to the differential voltage level on a bus using feedback, combining the output current from the gain stage with a threshold current, including in some examples hysteresis, to feed a current-to-voltage output stage to provide a data output signal. System 400 is operable to support a wide common mode range, provide low current consumption while achieving superior speed, and thus high data rate capabilities. Further, no input divider circuit is required since system 400 operates as a Transimpedance Amplifier (TIA) (low impedance input) device. Also, because system 400 utilizes analog circuity, no clock is required and thus no clock noise is injected into the bus.

Figure 5:
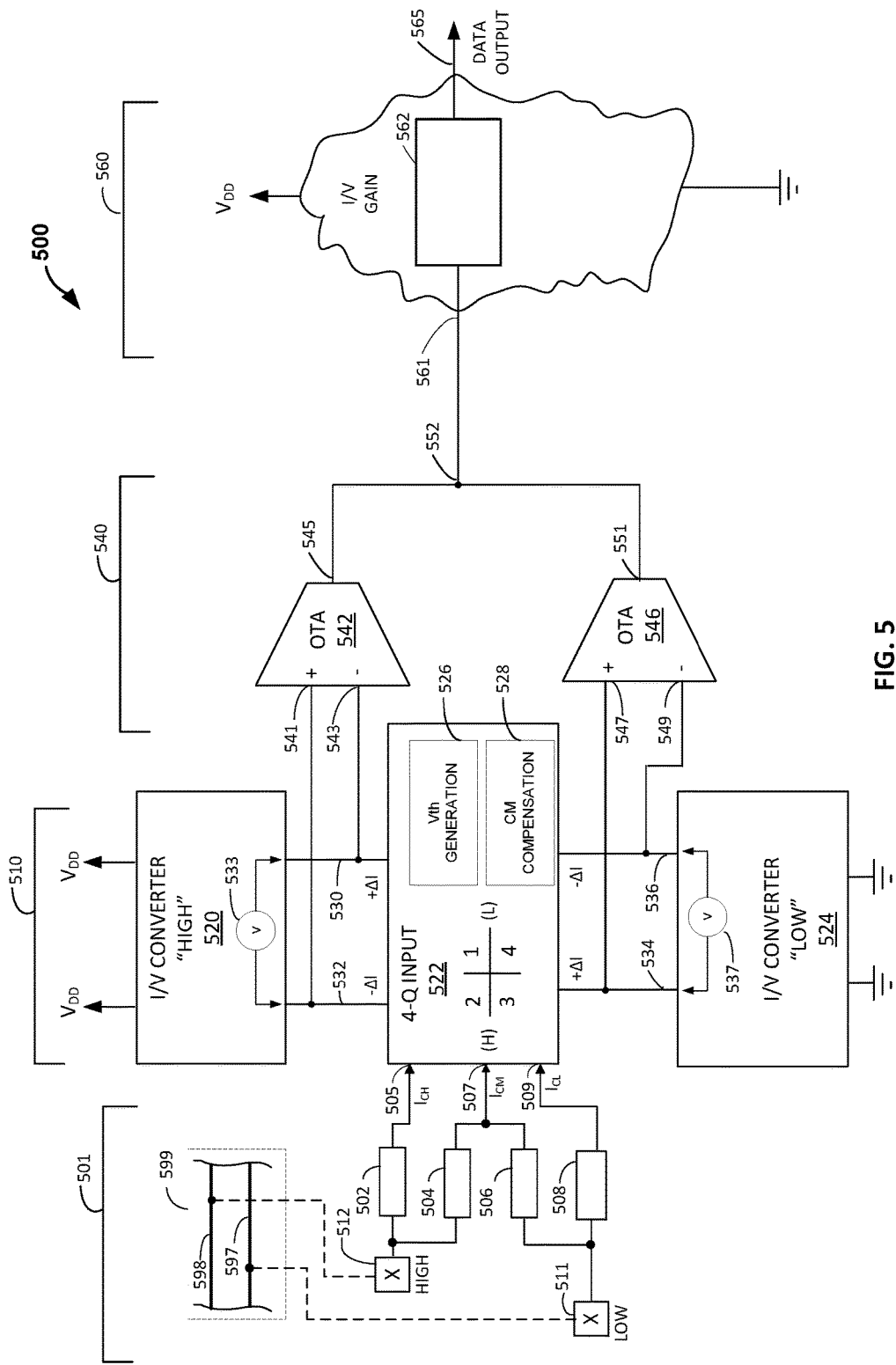
FIG. 5 is a schematic diagram illustrating a bus receiver system in accordance with one or more aspects of the present disclosure.

FIG. 5 is a schematic diagram illustrating an advanced bus receiver system 500 in accordance with one or more aspects of the present disclosure. The bus receiver system 500 as described herein represents one or more examples of a bus receiver system that can be used as a receiver located in a node, such as one or more of nodes 110, 112, through 120 as shown in the system 100 of FIG. 1, and as the receiver included in the transceiver 224 of node 210 as shown in system 200 of FIG. 2, and as receiver included in transceiver 324 of node 310 as show in FIG. 3. It would be understood that various examples of receiver system 500 could be used in a receiver in various systems having nodes coupled to a bus system, and is not limited to the examples illustrated by system 100, system 200, or node 310 as described herein.

As illustrated in FIG. 5, system 500 includes an input stage 510 coupled to a gain stage 540. In various examples, input stage 510 includes a four-quadrant input circuit 522 having a first input 505 ($I_{CH}$), a second input 509 ($I_{CL}$), and a third input 507 ($I_{CM}$). Four-quadrant input circuit 522 further includes a first output 530, a second output 532, a third output 534, and a fourth output 536. In various examples, four-quadrant input circuit 522 is operable to be coupled to a bus 599 through an input coupling circuit 501. Input coupling circuit 501 includes a first input 512 operable to be coupled to a first conductor 598 of bus 599, and a second input 511 operable to be coupled to a second conductor 597 of bus 599. As illustrated, first input 512 is coupled to first input 505 of the four-quadrant input circuit 522 through resistive load 502, and second input 511 is coupled to second input 509 of four-quadrant input circuit 522 through resistive load 508. In various examples, input coupling circuit 501 couples the four-quadrant input circuit 522 to a CAN-bus or a HS-CAN bus, wherein first input 512 is coupled to the CAN-High conductor 598, and second input 511 is coupled to the CAN-Low conductor 597 of bus 599. However, examples of the bus 599 to which input coupling circuit 501 is operable to be coupled to are not limited to a CAN-bus or to a HS-CAN bus, and can include various types of buses having two-conductors forming the bus structure.

In addition, as illustrated third input 507 ($I_{CM}$) is coupled to the first input 512 through resistive load 504, and in parallel, third input 507 ($I_{CM}$) is coupled to the second input 511 through resistive load 506. As noted above, in various examples the first input 512 is coupled to the CAN-High conductor 598 in bus 599 of a CAN bus or a HS-CAN bus system, and the second input 511 is coupled to the CAN-Low conductor 597 of the same bus or system, although system 500 is not limited to being coupled to a CAN bus or HS-CAN bus, and in various examples is coupled to any type of differential bus system having a two-conductor implementation. In various examples, resistive load 504 and 506 provide resistive loads having a same resistive value respectively, and are configured to provide a current at third input 507 ($I_{CM}$) representative of a common mode current relative to the current provided to first input 505 ($I_{CH}$) and the current provided to second input 509 ($I_{CL}$). In various examples, based on having a third (common mode current) input 507, four-quadrant input circuit 522 is operable to compensate for any common mode voltages that exist on the bus to which system 500 is operable to be coupled to. As illustrated, various examples of four-quadrant input circuit 522 include Common Mode (CM) compensation circuit 528.

Figure 6:
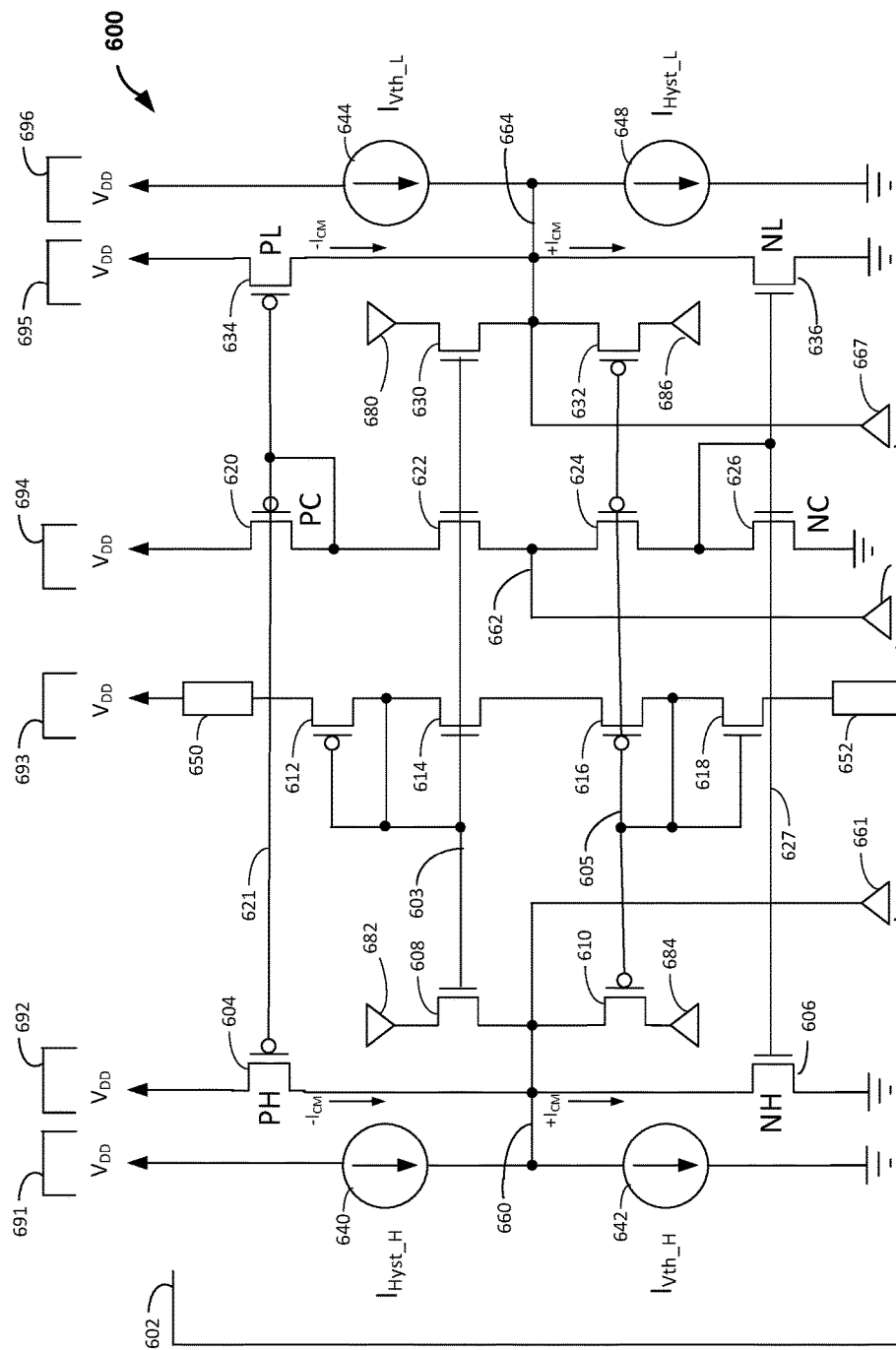
FIG. 6 is a schematic diagram of a four-quadrant input circuit in accordance with one or more aspects of the present disclosure.

Further details regarding the feature of common mode voltage level compensation are described herein with respect to FIG. 6.

As illustrated in FIG. 5, in various examples four-quadrant input circuit 522 provides threshold level generation as a built-in feature of the circuit. As illustrated, various examples of four-quadrant input circuit 522 include Vth generation circuit 526. Further details regarding voltage threshold level generation are described herein with respect to FIG. 6 and FIG. 11. In various examples, system 500 comprising four-quadrant input circuit 522 and gain stage 540 operate as a Transimpedance Amplifier (TIA) device. A TIA device is operable to receive current inputs, as opposed to voltage level inputs, and provides a low impedance input in order to receive the current inputs. In addition, by using current inputs, bias voltages applied to the semiconductor devices in four-quadrant input circuit 522 can be kept low, and therefore supply voltage $V_{DD}$ can be smaller, contributing to lower overall current consumption. In various examples, VD can be set to a value of +5 volts. In various examples, $V_{DD}$ can be set to a value of +3.3 volts. In various examples, $V_{DD}$ can be set to a value of +1.5 volts. In various examples, $V_{DD}$ is set to a positive voltage value less than +1.5 volts.

As illustrated in FIG. 5, four-quadrant input circuit 522 is coupled to current-to-voltage (I/V) converter 520 through the first output 530 and second output 532. Converter 520 is coupled to voltage supply $V_{DD}$, and is referred to as the "HIGH" converter. In various examples, first output 530 operates as a current sink, sinking current that is provided from converter 520 to first output 530, and second output 532 operates as a current sink, sinking current that is provided by converter 520. In various examples, based on the current flows to first output 530 and to second output 532, the "HIGH" converter 520 is operable to generate a voltage differential 533 between first output 530 and second output 532. In various examples, and in contrast to system 400 of FIG. 4, voltage differential 533 in FIG. 5 is operable to provide both a negative voltage differential and a positive voltage differential based on the relative level of current flows between first output 530 and second output 532. In various examples, a negative voltage differential at voltage differential 533 is a voltage differential having a polarity that when applied to inputs 541 and 543 of first amplifier 542 as illustrated in FIG. 5, causes the output 545 of first amplifier 542 to act as a current sink operable to sink current from output node 552. In various examples, a positive voltage differential at voltage differential 533 is a voltage differential having a polarity that when applied to inputs 541 and 543 of first amplifier 542 as illustrated in FIG. 5, causes the output 545 of first amplifier 542 to act as a current source operable to provide current to output node 552.

As illustrated, four-quadrant input circuit 522 is also coupled to current-to-voltage (I/V) converter 524 through third output 534 and fourth output 536. Converter 524 is coupled to ground, and is referred to as the "LOW" converter. In various examples, third output 534 operates as a current source, sourcing current from third output 534 to converter 524, and fourth output 536 operates as a current source, sourcing current from fourth output 536 to converter 524. In various examples, based on the current flows from third output 534 and from fourth output 534, the "LOW" converter 524 is operable to generate a voltage differential 537 between third output 534 and fourth output 536. In various examples, and in contrast to system 400 of FIG. 4, voltage differential 537 in FIG. 5 is operable to provide both a negative voltage differential and a positive voltage differential based on the relative level of current flows between third output 534 and fourth output 536. In various examples, a negative voltage differential at voltage differential 537 is a voltage differential having a polarity that when applied to inputs 547 and 549 of second amplifier 546 as illustrated in FIG. 5, causes the output 551 of second amplifier 546 to act as a current sink operable to sink current from output node 552. In various examples, a positive voltage differential at voltage differential 537 is a voltage differential having a polarity that when applied to inputs 547 and 549 of second amplifier 546 as illustrated in FIG. 5, causes the output 551 of second amplifier 546 to act as a current source operable to provide current to output node 552.

In various examples, gain stage 540 includes the first amplifier 542 and the second amplifier 546 referred to above. In various examples, first amplifier 542 and second amplifier 546 are Operational Transconductance Amplifiers (OTAs). As described above, OTAs are amplifiers that provide a current controlled output based on a voltage difference provided to the inputs of the OTA and a transconductance "$g_m$" of the amplifier. In effect, an OTA is a voltage controlled current source, wherein the output current provided from or sunk by an output of the OTA is controlled by the voltage differential provided between the inputs of the OTA.

As illustrated in FIG. 5, first amplifier 542 includes a non-inverting input 541 that is coupled to second output 532, an inverting input 543 that is coupled to first output 530, and an output 545. In various examples, as discussed above first amplifier 542 is operable to both sink current from and to provide current to output node 552, based on the difference in the voltages received at non-inverting input 541 and inverting input 543 of first amplifier 542. As illustrated in system 500, the difference in voltages received at non-inverting input 541 and inverting input 543 of first amplifier 542 is voltage differential 533 generated by "HIGH" converter 520. Output 545 provides an output that is coupled to output node 552. As illustrated in FIG. 5, second amplifier 546 includes a non-inverting input 547 that is coupled to third output 534, an inverting input 549 that is coupled to fourth output 536, and an output 551. In various examples, as discussed above second amplifier 546 is operable to both sink current from and to provide current to output node 552, based on the difference in the voltages received at non-inverting input 547 and inverting input 549 of second amplifier 546. As illustrated in system 500, the difference in voltage received at non-inverting input 547 and inverting input 549 of second amplifier 546 is voltage differential 537 generated by "LOW" converter 524. Output 551 provides an output that is coupled to output node 552.

Based on the voltage differential 533 provided to first amplifier 542 and the voltage differential 537 provided to second amplifier 546, first amplifier 542 and second amplifier 546 are operable to sink current from output node 552, or to source current to output node 552. Also in contrast to system 400 illustrated in FIG. 4, in system 500 as illustrated, no feedback from the output of first amplifier 542 or from the output of second amplifier 546 to the outputs of the four-quadrant input circuit 522 are required because the issues related to common mode current have been compensated for within four-quadrant input circuit 522 using CM compensation circuit 528 and based on the common mode current provided at third input 507 ($I_{CM}$) of the four-quadrant input circuit 522. As illustrated in FIG. 5, the current provided by first amplifier 542 at output 545 is coupled with the current output provided by second amplifier 546 from output 551 at output node 552. The summed currents received at output node 552 can be a positive current flow, wherein both output 545 and output 551 provide (source) current to output node 552, or can be a negative current flow, wherein both output 545 and output 551 sink current from output node 552.

In various examples, output node 552 is coupled to I/V gain stage 560. In various examples, I/V gain stage 560 includes an input 561 coupled to device 562, and a data output 565 coupled to device 562. Input 561 is also coupled to output node 552, and is operable to receive a current flow provided to output 552, and to allow current flows from gain stage 560 to output node 552. In various examples, I/V gain stage 560 is operable to convert the current flows received at input 561 into a corresponding voltage level, and to output the voltage level as a first data state at data output 565, and to convert current flows being sunk from input 561 and gain stage 560 by output node 552 into a different corresponding voltage level, and to output a different corresponding voltage levels at data output 565 representative of a second data state. In various examples, I/V gain stage 560 is coupled to voltage supply $V_{DD}$ and ground, and provides a high input impedance at input 561 to minimize the influence of I/V gain stage 560 on the current flows at output node 552, while providing a low impedance output level at data output 565. In various examples, device 562 is a buffer arranged in order to provide high input impedance and fast switching speed for gain stage 560, and to provide a driver for data output 565. In various examples, device 562 is a CMOS inverter circuit. In various examples, device 562 is operable to provide a voltage gain between the voltage levels provided to input 561 and data output 565. In various examples, the voltage gain provided by device 562 is greater than one. Device 562 is not limited to a particular type of device or circuit, and can comprise any device or circuit operable to be coupled to a current flow at input 561 and to provide a voltage level output to data output 565 based on the current flow. In various examples, the voltage level output provided to data output 565 comprise voltage levels that are compatible switching voltage levels for CMOS devices. In various examples, the voltage level provided at data output 565 when representative of a first data state is a voltage level provided when a RECESSIVE level signal is being provided at inputs 512 and 511 of system 500, and the voltage level provided at data output 565 when representative of a second data state is a voltage level provided when a DOMINANT level signal is being provide at input 512 and 511 of system 500.

In various examples, data output 565 is operable to be coupled to a controller, such as controller 222 in FIG. 2, or controller 322 in FIG. 3, and is operable to provide a signal to the controller, the signal provided to the controller representative of the data that being provided by the bus coupled to system 500 at inputs 511 and 512. In various examples, gain stage 560 is operable to provide the data output signal in compliance with voltage levels requirements and other transmission signal requirements needed by the downstream controller to properly further process the incoming data being provided at inputs 511 and 512 via bus 599.

In operation, voltage differences present on bus 599 between bus conductors 597 and 598 are converted to current inputs to four-quadrant input circuit 522 through resistive loads 502 and 508. In various examples, varying voltage levels are provided by the bus 599 representative of data signals. For example, a first data state, for example a data bit having a first value, can be represented by a voltage differential between conductors 597 and 598 that is near zero, or a very small voltage difference that is below some defined threshold voltage difference. A second data state, for example a different data bit having a second value different from the data bit having the first value, can be represented by a voltage differential between conductors 597 and 598 that exceeds a minimum threshold voltage level for a voltage differential value. In various examples, the first data state is representative of a "RECESSIVE" data state (voltage differential), and a second data state is representative of a "DOMINANT" data state (voltage differential) for a CAN bus or HS-CAN bus compliant system, although examples of a first data state and a second data state are not limited to being RECESSIVE and DOMINANT CAN bus or HS-CAN bus data states. A further example illustration of data that can be represented on bus 599 is illustrated and further explained with respect to FIG. 11 of this disclosure.

In system 500 of FIG. 5, the voltage levels present on bus 599 are received at inputs 512 and 511, and are coupled to first input 505 through resistive load 502 and to second input 509 through resistive load 508, respectively. In addition, any common mode voltage existing on bus 599 is provided as a common mode current at third input 507 ($I_{CM}$) to the four-quadrant input circuit 522 by the coupling of third input 507 to inputs 512 and 511 through resistive loads 504 and 506 respectively. In this manner, the voltage levels present on first conductor 598 are provided as a corresponding current input at first input 505 ($I_{CH}$), the voltage levels present on second conductor 597 are provided as a corresponding current input at second input 509 ($I_{CL}$), and any common mode voltage present on conductors 598 and 597 of bus 599 is provided as a corresponding common mode current at third input 507 ($I_{CM}$) of four-quadrant input circuit 522. A difference in the level of current received at first input 505 ($I_{CH}$) and the level of current received at second input 509 ($I_{CL}$) of four-quadrant input circuit 522 controls the difference in current flows being sunk by first output 530 and being sunk at second output 532, and further controls the difference in current flow being provided from third output 534, and being provided from fourth output 536. In addition, CM compensation circuit 528 of four-quadrant input circuit 522 is operable to remove the common mode current component present, if any, from the current components $I_{CH}$, received at first input 505, and $I_{CL}$ received at second input 509, based on the current received at third input 507 ($I_{CM}$).

As noted above, a first data state can be represented on bus 599 when the voltage difference between conductors 597 and 598 of bus 599, (and thus between input 511 and 512 of the input coupling circuit 501) is substantially zero, or below a pre-determined threshold voltage differential level, and therefore the difference in current $I_{CH}$ provided at first input 505 and current $I_{CL}$ provided at second input 509 is substantially zero or relatively small. In various examples, Vth generation circuit 526 is operable to, based on the difference in the current flow $I_{CH}$ provided at input 505 and the current flow $I_{CL}$ provided at input 509 being less than a minimum difference, remove an amount of current from the current provided by input 505 (current $I_{CH}$), and to add an amount of current provided by input 509 (current $I_{CL}$). As a result, an imbalance in the level of current flow being provided to first output 530 and being provided to second output 532 is created, and an imbalance in the level of current flow being provided from third output 534 and from fourth output 536 is created. This imbalance created between first output 530 and second output 532 of circuit 522 generates a negative voltage differential at voltage differential 533, that when applied to first amplifier 542, causes output 545 of first amplifier 542 to sink current from output node 552. The imbalance created between the current flows from third output 534 and from fourth output 536 also generate a negative voltage different at voltage differential 537, that when applied to second amplifier 546, causes output 551 of second amplifier 546 to sink current from output node 552. By sinking current from output node 552, first amplifier 542 and second amplifier 546 cause the current flow from node 552 to provide a current flow from input 561 of I/V gain stage 560 that is then converted to a voltage level that is provided at data output 565 as a voltage level indicative of a first data state being provided at bus 599. Further, any common mode current is also removed from the current outputs provided at first output 530, second output 532, third output 534, and forth output 536 by CM compensation circuit 528 within four-quadrant input circuit 522. This is another contrast to system 400 shown in FIG. 4, where the common mode current is sourced from "HIGH" I/V converter 420 and sunk to "LOW" I/V converter 424 in addition.

In various examples, the voltage difference between conductors 597 and 598 of bus 599 is operable to transition to a level that exceeds a minimum threshold differential voltage, the voltage difference representative of a second data state, the second data state representative of a data state different from the first data state. The second data state can be represented on bus 599 when the voltage difference between conductors 597 and 598 of bus 599, (and thus between inputs 511 and 512 of the input coupling circuit 501) exceeds a minimum (threshold) differential voltage level. This differential voltage level provided between input 511 and input 512 results in a difference in current ($I_{CH}$) provided at first input 505 and a current ($I_{CL}$) provided at second input 509 of four-quadrant input circuit 522. In various examples, when a voltage differential between conductor 597 and 598 is being provided by bus 599 that is indicative of a second data state, the voltage levels provided by conductors 597 and 598 are different from a voltage level provided by conductors 597 and 598 when bus 599 is providing voltage levels representative of the first data state. In various examples, the voltage level provided by conductor 597 when bus 599 is providing the second data state is lower than the voltage level provided by conductor 597 when bus 599 is providing the first data state, resulting in a current input level for $I_{CL}$ at input 509 that is smaller than the current input level for $I_{CL}$ at input 509 when bus 599 is in the first data state. Further, the voltage level provided by conductor 598 when bus 599 is providing the second data state is higher than the voltage level provided by conductor 598 when bus 599 is providing the first data state, resulting in a current input level for $I_{CH}$ at input 505 that is larger than the current input level for $I_{CH}$ at input 505 when bus 599 is providing the first data state.

As the current flow $I_{CH}$ into first input 505 increases, and the current flow $I_{CL}$ into second input 509 decreases, Vth generation circuit 526 is operable to provide a switchover point wherein the current flows through the "HIGH" side of circuit 522 (consisting of the current being sunk by second output 532 with the current provided at input 505 and the current provided from third output 534), exactly matches the current flow through the "LOW" side of circuit 522 (consisting of the current being sunk at first output 530 with the current provided at input 509 and the current being provided at fourth output 536). As the voltage differential level between the conductors 597 and 598 continues to increase, the current input $I_{CH}$ continues to increase and the current input level $I_{CL}$ continues to decrease, exceeding the switchover point established by Vth generation circuit 526. As a result, the current flow through the "HIGH" side of circuit 522 exceeds the current flow through the "LOW" side of circuit 522, and Vth generation circuit 526 is operable to switch the outputs of circuit 522 so that first output 530 and second output 532 provide a positive voltage differential at voltage differential 533, and so that third output 534 and fourth output 536 now also provide a positive voltage differential at voltage differential 537. The positive voltage differential provided by voltage differential 533 is provided to first amplifier 542, causing first amplifier 542 to switch from acting as a current sink to now act as a current source, and to provide current to output node 552. The positive voltage differential provided by voltage differential 537 is provided to second amplifier 546, causing second amplifier 546 to switch from acting as a current sink to now act as a current source, and to provide current to output node 552. The current flows provided from first amplifier 542 and from second amplifier 546 are summed at output node 552, and the summed currents are provided to input 561 of I/V gain stage 560. I/V gain stage 560 converts the current flow received at input 561 into a voltage level, using device 562, which is indicative of the second data state. In various examples, the output voltage level provided at data output 565 when bus 599 provides the second data state is approximately +5 volts. However, examples are not limited to data output 565 providing approximately +5 volts when bus 599 is providing a voltage differential indicative of the second data state, and in various examples, data output 565 provides a voltage level in a range that is indicate of the second data state being provided on bus 599. As a result, when bus 599 is providing voltage levels on conductors 597 and 598 representative of the second data state, four-quadrant input circuit 522 provided voltage differentials at outputs 530, 532, 534, and 536 that when applied to first amplifier 542 and second amplifier 546, cause the amplifiers to each provide a current flow to output node 552 that, when summed together at output node 552, is representative of the second data state being present on bus 599.

In various examples, after providing the second data state on bus 599, bus 599 is operable to return to providing voltage levels on conductors 597 and 598 again representative of the first data state. In various examples, returning to voltage levels provided on conductors 597 and 598 representative of the first data state includes returning conductors 597 and 598 to having a differential voltage level between the conductors that is less than a maximum (threshold) voltage differential level representative of the first data state. In various examples, the maximum differential voltage level when switching from the first state to the second data state is different from the differential voltage level used to switch the outputs of circuit 522 when circuit 522 was transitioning from the first data state to the second data state.

In various examples, as bus 599 transitions from providing the second data state to providing the first data state, the voltage level provided by conductor 597 begins to rise, increasing the current flow $I_{CL}$ being provided at input 509, and the voltage level provided by conductor 598 begins to fall, decreasing the current flow $I_{CH}$ being provided at input 505. As the current flow $I_{CH}$ into input 505 decreases, and the current flow $I_{CL}$ into input 509 increases, Vth generation circuit 526 is operable to provide a switchover point wherein the current flows through the "HIGH" side of circuit 522 (consisting of the current being sunk by second output 532 with the current provided at input 505 and the current provided from third output 534) exactly matches the current flow through the "LOW" side of circuit 522 (consisting of the current being sunk at first output 530 with the current provided at input 509 and the current being provided at fourth output 536). As the voltage differential level between the conductors 597 and 598 continues to decrease, the current input level $I_{CH}$ at first input 505 continues to decrease and the current input level $I_{CL}$ at second input 509 continues to increase, wherein the difference in current flows is now below the switchover point established by Vth generation circuit 526. As a result, Vth generation circuit 526 is operable to configure first output 530 and second output 532 to switch from providing a positive voltage differential at voltage differential 533 to again providing a negative voltage differential at voltage differential 533, and to switch third output 534 and fourth output 536 from providing a positive voltage differential at voltage differential 537 to again providing a negative voltage differential at voltage differential 537. The negative voltage differential provided by voltage differential 533 causes first amplifier 542 to switch from acting as a current source to again acting as a current sink relative to output node 552, and the negative voltage differential provided by voltage differential 537 causes second amplifier 546 to switch from acting as a current source to again acting as a current sink relative to output node 552. The current flows provided to first amplifier 542 and second amplifier 546 are summed at output node 552, and the summed current flows from output node 552 are coupled to input 561 of I/V gain stage 560. The summed currents being sunk from output node 552 cause a current flow from input 561 of output stage 560 that causes device 562 to switch from providing a voltage level at data output 565 representative of the second data state to providing a voltage level at data output 565 representative of the first data state. As described above, Vth generation circuit 526 of four-quadrant input circuit 522 is operable to provide hysteresis with respect to the voltage levels used as a switch point when transitioning from providing the first data state to providing the second data state relative to the switch point used when transitioning from providing the second data state to providing the first data state. Further, any common mode current ($I_{CM}$) provided at third input 507 is also removed from the current inputs 505 ($I_{CH}$) and 509 ($I_{CL}$) of circuit 522 during the time circuit 522 is providing outputs representative of the first data state, while transitioning from the first data state to the second data state, while providing outputs representative of the second data state, and while transition for providing outputs representative of the second data state to providing outputs representative of the first data state.

In various examples, system 500 provides several advantages over existing bus receivers systems. For example, because system 500 includes four-quadrant input circuit 522 and operates as a Transconductance Operational Amplifier device, system 500 operates as an analog system, and does not require a clock input to process data. Thus, system 500 does not introduce clock noise back onto a bus to which system 500 is operable to be coupled to. This also avoids the 1/fCLK jitter normally included at Receive Data Output (RxD) line in switched capacitor receiver circuit concepts shown by various examples of transceivers in differential bus communication systems. The components of system 500 also require lower current consumption levels when compared for example to bus receivers that utilize a differential voltage gain input buffer (Bipolar or CMOS input stage) or a differential switched capacitor voltage input gain buffer. In various examples, one or more semiconductors included in four-quadrant input circuit 522 utilize a thin gate semiconductor devices. In various examples, semiconductor devices having gate oxide thicknesses in the range of 2.2 nanometers are utilized in four-quadrant input circuit 522. Use of thin gate semiconductor devices provides for smaller footprint for circuit devices, and faster speeds. In various examples, device sizes are in a range of 24 μm. In various examples, devices with thin gate semiconductors utilized in four-quadrant input circuit 522 includes single device having transient frequencies in a range of 600 MHz. In various examples, system 500 includes a wide common mode specification that exceeds minimum requirements of customers and various standards, and eliminates the need for input division factor, thus increasing threshold level accuracy. In various examples, system 500 provides a common mode range of +/−24 volts while keeping threshold voltage levels within a window from +0.5V to +0.9V. In various examples system 500 provides a common mode range up to +/−60 volts.

In various examples, system 500 operates with superior speed, thus providing data rate capabilities in the range of 5 Mbits per second. In various examples, system 500 provides superior symmetry parameter for CAN-FD application. As noted above, the four-quadrant input circuit 522 provides built in threshold voltage generation, including hysteresis if required, and provides built in common mode compensation. These features provide more stable and precise threshold voltage generation, better symmetry due to the high gain stages, and high speed (data rates) at a low level of current consumption.

FIG. 6 is a schematic diagram of a four-quadrant input circuit 600 in accordance with one or more aspects of the present disclosure. As shown in FIG. 6, circuit 600 includes a four-quadrant input circuit 602. As illustrated, four-quadrant input circuit 602 includes a first input 661 ($I_{IN\_H}$), a second input 667 ($I_{IN\_L}$), and a third input 665 ($I_{IN\_CM}$). As illustrated, four-quadrant input circuit 602 also includes first output 680, second output 682, third output 684, and a fourth output 686.

In various examples, four-quadrant input circuit 602 is the four-quadrant input circuit 522 as shown in FIG. 5, wherein first input 661, second input 667, and third input 665 of four-quadrant input circuit 602 in FIG. 6 correspond to first input 505, second input 509, and third input 507, respectively, of four-quadrant input circuit 522, and wherein first output 680, second output 682, third output 684, and fourth output 686 of four-quadrant input circuit 602 as shown in FIG. 6 correspond to first output 530, second output 532, third output 534, and fourth output 536, respectively, of four-quadrant input circuit 522 as shown in FIG. 5. However, examples of four-quadrant input circuit 602 are not limited to the examples illustrated in FIG. 5, or to any particular examples of four-quadrant input circuits, wherein four-quadrant input circuit 602 is operable to be used in one or more examples of methods, systems, and devices as described in this disclosure.

As illustrated in FIG. 6, N-type semiconductor device 608 includes a first terminal coupled to second output 682, a second terminal coupled to node 660, and a gate coupled to node 603. P-type semiconductor device 610 includes a first terminal coupled to node 660, a second terminal coupled to third output 684, and a gate coupled to node 605. As illustrated, the first input 661 ($I_{IN\_H}$) of circuit 602 is coupled to node 660. In various examples, second output 682, semiconductors 608 and 610, node 660, and third output 684 are referred to as the "HIGH" side of four-quadrant input circuit 602, wherein a flow of current is received at second output 682, passing to node 660, and provided as a current output at third output 684 is controlled by a current flow $I_{IN\_H}$ provided by first input 661. As illustrated in FIG. 6, N-type semiconductor device 630 includes a first terminal coupled to first output 680, a second terminal coupled to node 664, and a gate coupled to node 603. P-type semiconductor device 632 includes a first terminal coupled to node 664, a second terminal coupled to fourth output 686, and a gate coupled to node 605. As illustrated, the second input 667 ($I_{IN\_L}$) of circuit 602 is coupled to node 664. In various examples, first input 680, semiconductors 630 and 632, node 664, and fourth output 686 are referred to as the "LOW" side of four-quadrant input circuit 602, wherein a flow of current is received at first output 680, passing to node 664, and provided as a current output at fourth output 686 is controlled by a current flow $I_{IN\_L}$ provided by second input 667.

A first series connected string of devices 693 is included in circuit 600, arranged as follows. Resistive load 650 includes a first terminal coupled to supply voltage $V_{DD}$, and a second terminal coupled to a first terminal of P-type semiconductor device 612. P-type semiconductor device 612 includes a second terminal coupled to a first terminal of N-type semiconductor device 614, and a gate coupled to node 603. In addition, the second terminal of P-type semiconductor device 612 and the first terminal of N-type semiconductor device 614 are coupled to node 603. N-type semiconductor device 614 includes a second terminal coupled to a first terminal of P-type semiconductor device 616, and a gate coupled to node 603. P-type semiconductor device 616 includes a second terminal coupled to a first terminal of N-type semiconductor device 618, and a gate coupled to node 605. In addition, the second terminal of P-type semiconductor device 616 and the first terminal of N-type semiconductor device 618 are coupled to node 605. N-type semiconductor device includes a second terminal coupled to a first terminal of resistive load 652, and a gate coupled to node 605. Resistive load 652 includes a second terminal coupled to ground.

A second series connected string of devices 694 is included in circuit 600, arranged as follows. P-type semiconductor device (PC) 620 includes a first terminal coupled to supply voltage $V_{DD}$, a second terminal coupled to a first terminal of N-type semiconductor device 622, and a gate coupled to node 621. In addition, the second terminal of P-type semiconductor device 620 and the first terminal of N-type semiconductor device 622 are coupled to node 621. N-type semiconductor device 622 includes a second terminal coupled to a first terminal of P-type semiconductor device 624 at node 662, and a gate coupled to node 603. P-type semiconductor device 624 includes a second terminal coupled to a first terminal of N-type semiconductor device (NC) 626, and a gate coupled to node 605. N-type semiconductor device 626 includes a second terminal coupled to ground, and a gate coupled to node 627. In addition, the second terminal of P-type semiconductor device 624 and the first terminal of N-type semiconductor device 626 are coupled to node 627. As illustrated for circuit 600, the third input 665 ($I_{IN\_CM}$) is coupled to node 662.

A third series connected string of devices 692 is included in circuit 600 arranged as follows. A first terminal of P-type semiconductor device 604 (PH) is coupled to supply voltage $V_{DD}$. P-type semiconductor device 604 includes a second terminal coupled to a first terminal of N-type semiconductor device (NH) 606 at node 660, and a gate coupled to node 621. N-type semiconductor device 606 includes a second terminal coupled to ground, and a gate coupled to node 627. A fourth series connected string of devices 695 is included in circuit 600, arranged as follows. A first terminal of P-type semiconductor device (PL) 634 is coupled to supply voltage $V_{DD}$. P-type semiconductor device 634 includes a second terminal coupled to a first terminal of N-type semiconductor device (NL) 636 at node 664, and a gate coupled to node 621. N-type semiconductor device 636 includes a second terminal coupled to ground, and a gate coupled to node 627.

In various examples, a fifth string of one or more devices 691 is included in circuit 600, arranged as follows. Current source 640 ($I_{HYST\_H}$) includes a first terminal coupled to voltage supply $V_{DD}$, and a second terminal coupled to node 660. In various examples, current source 640 ($I_{HYST\_H}$) is configured to source current to node 660. In various examples, a second current source 642 ($I_{Vth\_H}$) includes a first terminal coupled to node 660, and a second terminal coupled to ground. In various examples, second current source 642 ($I_{Vth\_H}$) is operable to sink current from node 660 to ground. In various examples, a sixth string of one or more devices 696 is included in circuit 600, arranged as follows. Current source 644 ($I_{Vth\_L}$) includes a first terminal coupled to supply voltage $V_{DD}$, and a second terminal coupled to node 664. In various examples, current source 644 ($I_{Vth\_L}$) is configured to source current to node 664. In various examples, a second current source 648 ($I_{HYST\_L}$) includes a first terminal coupled to node 664, and a second terminal coupled to ground. In various examples, second current source 648 ($I_{HYST\_L}$) is operable to sink current from node 664 to ground.

In operation, the series connected string of devices 693, including resistive loads 650 and 652, and semiconductor devices 612, 614, 616, 618, is operable to provide biasing voltages to the gates of each of semiconductor devices 608, 610, 630, 632, 622, and 624. As described above, the current flow through the "HIGH" side of four-quadrant input circuit 602 (from second output 682 to node 660 and out third output 684) include current $I_{IN\_H}$ provided at input 661, and the current flow through the "LOW" side of four-quadrant input circuit 602 (from first output 680 to node 664 and out fourth output 686) includes current $I_{IN\_L}$ provided at input 667. When inputs 661 and 667 are coupled to a two-conductor bus system that provides a first data state represented by having a voltage differential that is substantially zero, the current inputs at first input 661 and 667 will be substantially the same current. As a result, and because semiconductor devices 608, 610, 630, and 632 are biased from the same biasing circuit 693, without any additional manipulation the current flows through the "HIGH" side of four-quadrant input circuit 602 and the "LOW" side of four-quadrant input circuit 602 would be substantially equal, resulting in no current differential being generated between first output 680 and second output 682, and no current differential being generated between third output 684 and fourth output 686.

When this first data state is represented by the current inputs being provided at input 661 and 667, in various examples a negative current differential, representative of this first data state, is desired to be provided between first output 680 and second output 682, and between third output 684 and fourth output 686. In order to generate a negative current differential between first output 680 and second output 682 and a negative current differential between third output 684 and fourth output 686, four-quadrant input circuit 602 operates current source 642 coupled to node 660 and current source 644 coupled node 664 in order to create an imbalance between the current flow through the "HIGH" side of circuit 602 and the "LOW" side of circuit 602. As illustrated, current source 642 operates as a current sink, sinking current away from node 660, up to a threshold current level, that will reduce the current flow through the "HIGH" side of four-quadrant input circuit 602. In addition, current source 644 operates as a current source, sourcing current to node 664, increasing the current flow through the "LOW" side of four-quadrant input circuit 602. The decrease in current flow through the "HIGH" side and the increase in current flow through the "LOW" side of circuit 602 results in an imbalance in the current flows between the "HIGH" side relative to the flow of current through the "LOW" side of four-quadrant input circuit 602. This resulting imbalance in current flows generates a negative current differential between first output 680 and second output 682, and a negative current differential between third output 684 and fourth output 686. By providing these negative current differential outputs, when inputs 661 and 667 are providing current inputs representative of the first data state, four-quadrant input circuit 602 provides outputs that can be coupled to a gain stage and to an output stage, such as but not limited to gain stage 540 and output stage 560 as shown in FIG. 5, to provide a data output representative of the first data state.

In order to represent the second data state, (i.e. transition for the first data state to the second data state) in various examples the voltage level provided by a bus conductor that input 661 is coupled to begins to raise from the voltage level provided by that bus conductor when the first data state was being represented on the bus, and a voltage level provide by another (second) bus conducted that input 667 is coupled to begins to lower relative to the voltage level provided by that bus conductor when the first data state was represented on the bus. As a result, the current $I_{IN\_H}$ being provided at input 661 will begin to increase, and the current level $I_{IN\_L}$ being provided at input 667 will begin to decrease. During this transition when the voltage levels provided by the bus conductors are switching from providing the first data state to providing the second data state, current source 642 continues to sink current from node 660, but only up to a threshold current level $I_{Vt\_H}$, and current source 644 continues to source current to node 664, but only up to a threshold current level $I_{Vth\_L}$. The threshold current level $I_{Vth\_H}$ and the threshold current level $I_{Vth\_L}$ are set at levels so that as the differential voltage level provided by the conductors of the bus reaches the minimum voltage differential level (for example $V_{th\_DOMINANT}$ was shown in FIG. 11) representative of the second data state, the level of the current increase provided at input 661 equals the $I_{Vth\_H}$ threshold current level being sunk by current source 642, and level of the current decrease provided at input 667 equals the $I_{Vth\_L}$ threshold current level being sourced to node 664. Under these conditions, the imbalance of the current flow through the "HIGH" side and the "LOW" side of four-quadrant input circuit 602 no longer exists, and the current flows are equal. As the current flow provided at input 661 continues to increase, and the current flow provided at input 667 continues to decrease, the current flow through the "HIGH" side of four-quadrant input circuit 602 exceeds the current flow through the "LOW" side of circuit 602. When the current flow through the "HIGH" side exceeds the current flow through the "LOW" side of four-quadrant input circuit 602, circuit 602 switches from providing a negative current differential to providing a positive current differential between first output 680 and second output 682, and switches from providing a negative current differential to providing a positive current differential between third output 684 and fourth output 686, based on relative changes in the level of current flow through the HIGH side and the LOW side of circuit 602. By now providing these positive current differential outputs when inputs 661 and 667 are transitioning from providing current inputs representative of the first data state to current inputs representative of the second data state, four-quadrant input circuit 602 is operable to switch to providing output current differentials representative of the second data state that can be coupled to a current-to-voltage (I/V) converter stage, a gain stage and an output stage, such as but not limited to I/V converter stages 520 and 524, gain stage 540 and output stage 560 as shown in FIG. 5, to provide a data output representative of the second data state. In addition, as described above four-quadrant input circuit 602 is operable to set the threshold differential voltage level where these outputs will switch from providing the negative current differential to providing the positive current differential levels, and thus switches from providing an output representative of the first data state to providing an output representative of the second data state. Once four-quadrant input circuit 602 has switched from providing an output representative of the first data state to providing and output representative of the second data state, circuit 602 will continue to provide the output representative of the second data state until a change in the current flows at input 661 and input 667 occur that is again representative of the first data state.

Four-quadrant input circuit 602 is operable to return to providing an output representative of first data state after having provided an output representative of the second data state as follows. When transitioning back from providing outputs representative of a second data state to providing outputs representative of a the first data state, in various examples the voltage level provided by a bus conductor that input 661 is coupled to begins to return to the voltage level provided by that bus conductor when the first data state was being represented on the bus, and a voltage level provided by another (second) bus conducted that input 667 is coupled to begins to return to the voltage level provided by that bus conductor when the first data state was represented on the bus. In various examples, the voltage levels represented by the conductors of the bus when representing the first data state are substantially represented by having a same voltage level provided on both conductors.

Figure 11:
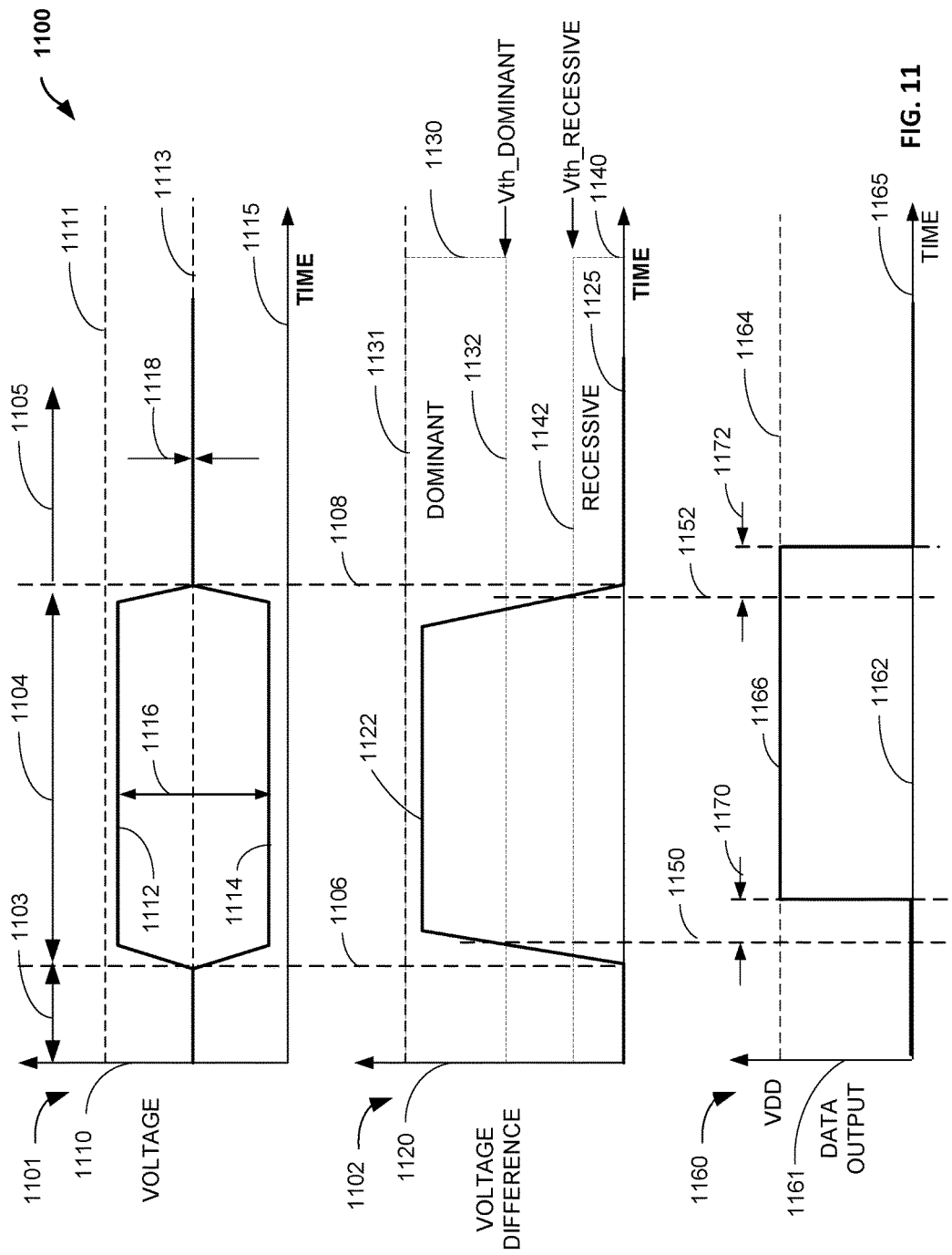
FIG. 11 is a graphical diagram illustrative of example electrical parameters in accordance with one or more techniques described in the present disclosure.

As a result of transitioning from the second data state to the first data state, the voltage level provided by the conductor coupled to first input 661 will begin to decrease, and the current $I_{IN\_H}$ being provided at input 661 will begin to decrease. In addition, the voltage level provided by the (second) conductor coupled to second input 667 will begin to increase, and therefore the current level $I_{IN\_L}$ being provided at input 667 will begin to increase. During this transition, when the voltage levels provided by the bus conductors are switching from providing the second data state to providing the first data state, current source 642 continues to sink current from node 660, but only up to a threshold current level $I_{Vth\_H}$, and current source 644 continues to source current to node 664, but only up to a threshold current level $I_{Vth\_L}$. However, now in addition to the current being sunk from node 660 by current source 642, a hysteresis current $I_{Hyst\_H}$ is provided to node 660 by current source 640, and in addition to the current being provided to node 664 by current source 644, a hysteresis current $I_{Hyst\_L}$ is sunk from node 664 by current source 648. By adding hysteresis current $I_{Hyst\_H}$ to node 660 and by sinking hysteresis current $I_{Hyst\_L}$ from node 664 during the transition from providing the second data state to providing the first data state, the point where the current flow through the "HIGH" side of circuit 602 exactly matches the current flow through the "LOW" side of circuit 602, and thus the switching point for the outputs of circuit 602 during this transition, can be set at a differential voltage level that is different from the differential voltage level set by circuit 602 when switching the outputs during the transition from the first data state to the second data state. The threshold current level $I_{Vth\_H}$ with the added hysteresis current $I_{Hyst\_H}$ and the threshold current level $I_{Vth\_L}$ with the removal of hysteresis current $I_{Hyst\_L}$ is operable to be set at levels so that as the differential voltage level provided by the conductors of the bus reaches the maximum voltage differential voltage level (for example $V_{th\_RECESSIVCE}$ as shown in FIG. 11) representative of the first data state, the level of the current decrease provided at input 661 plus the hysteresis current $I_{Hyst\_H}$ equals the $I_{Vth\_H}$ threshold current level being sunk by current source 642 at node 660, and level of the current increase provided at input 667 less the hysteresis current $I_{Hyst\_L}$ equals the $I_{Vth\_L}$ threshold current level being sourced to node 664. Under these conditions, the imbalance of the current flow through the "HIGH" side and the "LOW" side of four-quadrant input circuit 602 no longer exists, and the current flows are equal. As the current flow provided at input 661 continues to decrease, and the current flow provided at input 667 continues to increase, the current flow through the "HIGH" side of four-quadrant input circuit 602 no longer exceeds the current flow through the "LOW" side for four-quadrant input circuit 602. When the current flow through the "HIGH" side no longer exceeds the current flow through the "LOW" side of four-quadrant input circuit 602, circuit 602 switches from providing a positive current differential to providing a negative current differential between first output 680 and second output 682, and switches from providing a positive current differential to providing a negative current differential between third output 684 and fourth output 686. By now providing these negative current differential outputs when inputs 661 and 667 are transitioning from providing current inputs representative of the second data state to current inputs representative of the first data state, four-quadrant input circuit 602 is operable to switch to providing output current differentials representative of the first data state that can be coupled to an I/V converter stage, a gain stage, and an output stage, such as but not limited to I/V converter stages 520 and 524, gain stage 540 and output stage 560 as shown in FIG. 5, to provide a data output representative of the first data state. In addition, four-quadrant input circuit 602 is operable to set the threshold differential voltage level where these outputs will switch from providing the positive current differentials to providing the negative current differential levels at the outputs of circuit 602, and thus switch from providing an output representative of the second data state to providing an output representative of the first data state. In addition, by using the hysteresis as described above, four-quadrant input circuit 602 is operable to provide a switching point from providing outputs representative of the second data state to again providing outputs representative of the first data state at a differential voltage level that is different from the differential voltage level used by circuit 602 for switching the outputs when transitioning from the first data state to the second data state. In various examples, the differential voltage level set by circuit 602 for switching the outputs from providing a representation of the first data state to providing a representation of the second data state is a higher differential voltage level than the differential voltage level set by circuit 602 for switching the outputs from providing a representation of the second data state to providing a representation of the first data state. In various examples, current sources 640, 642, 644, and 648 as illustrated in FIG. 6 provide the circuits, functions, and features represented by the Vth generation circuit 526 illustrated in FIG. 5.

As illustrated in FIG. 6, four-quadrant input circuit 602 is also operable to provide common mode current compensation within circuit 602 to compensate for any common mode voltage that might exist at the bus conductors that inputs 661 and 667 are coupled to. As noted above, series connected string of devices 692 includes P-type semiconductor device 604 (PH) coupling supply voltage $V_{DD}$ to node 660, and is operable to source current from $V_{DD}$ to node 660, and semiconductor device 606 (NH) couples node 660 to ground, and is operable to sink current from node 660. As such, based on the biasing of semiconductor device 604 (PH) and semiconductor device 606 (NH), current provided by input 661 can be added to through current provided by semiconductor device 604 (PH), or subtracted from by current sunk through semiconductor device 606 (NH). Similarly, series connected string of devices 695 includes semiconductor device 634 (PL) coupling supply voltage $V_{DD}$ to node 664, and is operable to source current from $V_{DD}$ to node 664, and semiconductor device 636 (NL) couples node 664 to ground, and is operable to sink current from node 664. As such, based on the biasing of semiconductor device 634 (PL) and semiconductor device 636 (NL), current provided by input 667 can be added to through current provided by semiconductor device 634 (PL), or subtracted from by current sunk through semiconductor device 636 (NL).

Biasing for semiconductor devices 604 and 634 is provided by having the gates of these devices coupled to node 621, wherein node 621 is provided a biasing voltage level by a coupling to series connected string of devices 694 at a point between semiconductor devices 620 and 622. Biasing for semiconductor devices 606 and 636 is provided by having the gates of these devices coupled to node 627, wherein node 627 is provided a biasing voltage level by a coupling to series connected string of devices 694 of devices at a point between semiconductor devices 624 and 626. In addition, third input 665 ($I_{IN\_CM}$) is coupled to series connected string of devices 694 at node 662, node 662 corresponding to a point on series string of devices 694 between semiconductor devices 622 and 624. When positive current flow (that is, flow to input 665) is provided at node 662 by input 665 ($I_{IN\_CM}$) (representative of a positive common mode voltage level at inputs 661 and 667), additional current flow is provided to semiconductor devices 624 and semiconductor device (NC) 626, causing a voltage increase at node 627, and increasing the bias voltage at the gates of semiconductor devices (NH) 606 and (NL) 636. As a result, an increase in current $+I_{CM}$ as indicated by the arrows labeled $+I_{CM}$ pointing away from nodes 660 and 664, sink current from each of nodes 660 and 664, compensating the currents available at nodes 660 and 664 respectively for the common mode current. When a negative current flow (that is, flow out from input 665) is provided at node 662 by input 665 ($I_{IN\_CM}$) (representative of a negative common mode voltage level at inputs 661 and 667), additional current flow is provided from semiconductor devices 622 and semiconductor device (PC) 620, causing a voltage decrease at node 621, and increasing the bias voltage at the gates of semiconductor devices (PH) 604 and (PL) 634. As a result, an increase in current flow $-I_{CM}$, as indicated by the arrows labeled $-I_{CM}$ pointing towards nodes 660 and 664, sources current to each of nodes 660 and 664, compensating the currents available at nodes 660 and 664 respectively for the negative common mode current. Thus, input 665, second series connected string of devices 694, and semiconductor devices 604, 606, 634, and 636, as arranged in four-quadrant input circuit 602, provide common mode current compensation within four-quadrant input circuit 602.

When current flow is not provided at node 662 by input 665 ($I_{IN\_CM}$), either positively or negatively, there is a state where no level of common mode current exists between input 661 and 667. In this case, second series connected string of devices 694 is operable to bias each of semiconductor devices 604, 606, 634, and 636 so that no current is sourced to nodes 660 and 664, and no current is sunk from nodes 660 and 664 through any of semiconductor devices 604, 606, 634, and 636. In various examples, these functions as described with respect to common mode current compensation are included in the four-quadrant input circuit 522 in FIG. 5 as CM compensation circuit 528. In various examples, semiconductor devices 604, 606, 620, 622, 624, 626, 634, and 636, as arranged in FIG. 6, provide the circuit, functions, and features of CM compensation circuit 528 as shown in FIG. 5.

Figure 7:
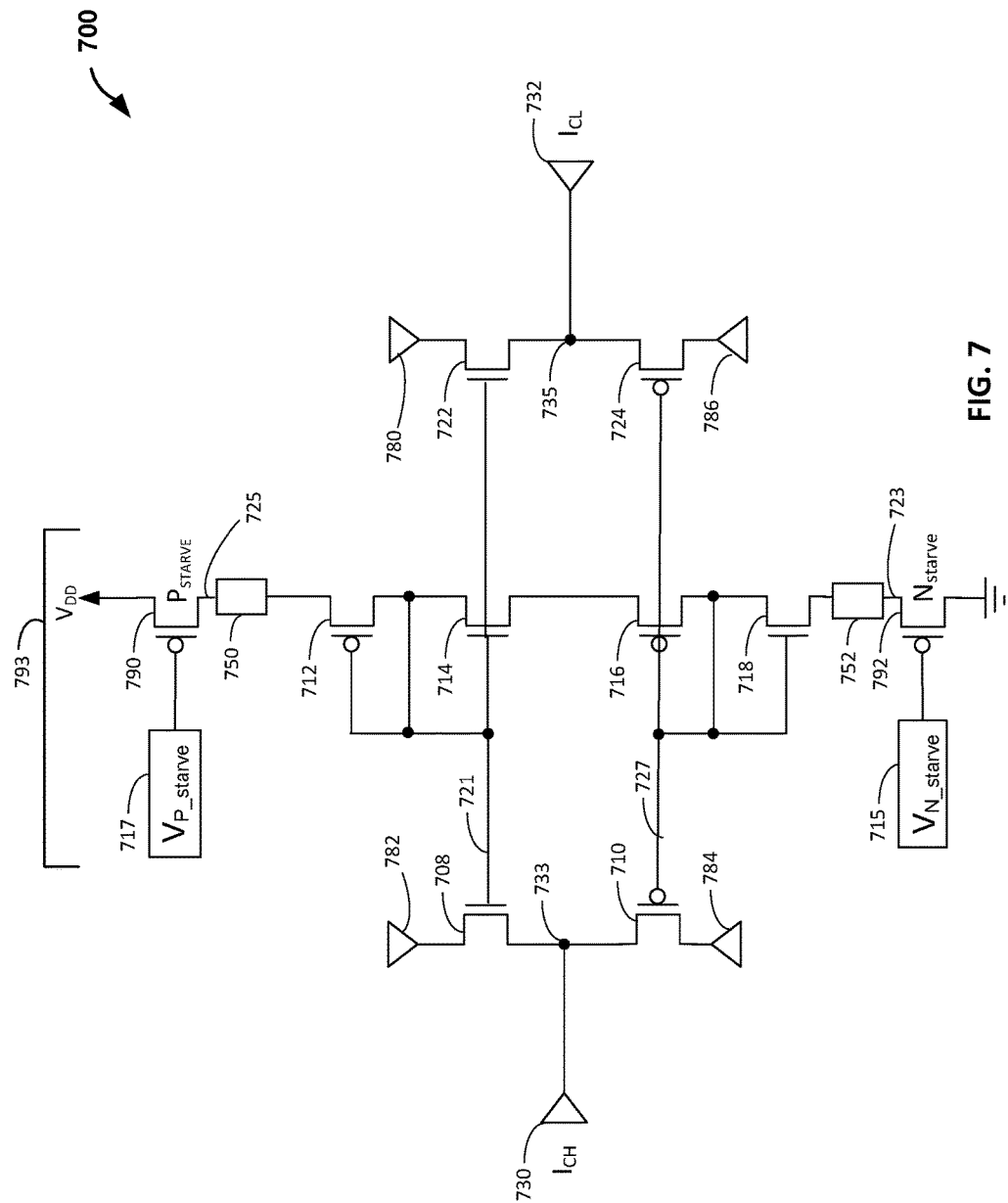
FIG. 7 is a schematic diagram of a four-quadrant input circuit in accordance with one or more aspects of the present disclosure.

FIG. 7 is a schematic diagram of a four-quadrant input circuit 700 in accordance with one or more aspects of the present disclosure. As illustrated, four-quadrant input circuit 700 includes a first input 730 ($I_{CH}$), and a second input 732 ($I_{CL}$). As illustrated, four-quadrant input circuit 700 also includes a first output 780, a second output 782, a third output 784, and a fourth output 786. Second output 782 is coupled to a first terminal of N-type semiconductor device 708. N-type semiconductor device 708 includes a second terminal coupled to node 733, and a gate coupled to node 721. First input 730 ($I_{CH}$) is coupled to node 733, along with a first terminal of P-type semiconductor device 710. P-type semiconductor device 710 also includes a second terminal coupled to third output 784, and a gate coupled to node 727. First output 780 is coupled to a first terminal of N-type semiconductor device 722. N-type semiconductor device 722 includes a second terminal coupled to node 735, and a gate coupled to node 721. Second input 732 ($I_{CL}$) is coupled to node 735, along with a first terminal of P-type semiconductor device 724. P-type semiconductor device 724 also includes a second terminal coupled to fourth output 786, and a gate coupled to node 727.

A series connected string of devices 793 is included in circuit 700, arranged as follows. P-starve semiconductor device 790 has a first terminal coupled to voltage supply $V_{DD}$, a second terminal coupled to a first terminal of resistive load 750, and a gate coupled to a source ($V_{P\_starve}$) 717 operable to provide a control voltage ($V_{P\_starve}$) to the gate of P-starve semiconductor device 790. A second terminal of resistive load 750 is coupled to a first terminal of P-type semiconductor device 712. P-type semiconductor device 712 includes a second terminal coupled to a first terminal of N-type semiconductor device 714, and a gate coupled to node 721. In addition, the second terminal of P-type semiconductor device 712 and the first terminal of N-type semiconductor device 714 are coupled to node 721. N-type semiconductor device 714 includes a second terminal coupled to a first terminal of P-type semiconductor device 716, and a gate coupled to node 721. P-type semiconductor device 716 includes a second terminal coupled to a first terminal of N-type semiconductor device 718, and a gate coupled to node 727. In addition, the second terminal of P-type semiconductor device 716 and the first terminal of N-type semiconductor device 718 are coupled to node 727. N-type semiconductor device 718 includes a second terminal coupled to a first terminal of resistive load 752, and a gate coupled to node 727. Resistive load 752 includes a second terminal coupled to a first terminal of N-starve semiconductor device 792. N-starve semiconductor device 792 includes a second terminal coupled to ground, and a gate coupled to a source ($V_{N\_starve}$) source 715 operable to provide a control voltage ($V_{N\_starve}$) to the gate of N-starve semiconductor device 792.

In operation, the series connected string of devices 793 provides biasing voltages to each of the gates semiconductor devices 708, 710, 722, and 724. Control of voltages applied to the gates of semiconductor devices 708, 710, 722, and 724 controls the current flow through these devices, and thus provides control over the current flow between the node and the output each of these devices is respectively coupled to. Semiconductor devices 708, 710, 722, and 724 are biased by the series string of devices 793 providing a bias voltage level to the gates of semiconductor devices 708 and 722 via node 721, and a bias voltage level provided to the gates of semiconductor devices 710 and 724 via node 727. Biasing provided by devices 793 at node 721 biases N-type semiconductor device 708 to allow a current flow from second output 782 to node 733, and biasing provided by devices 793 at node 721 biases N-type semiconductor device 722 to allow a current flow from first output 780 to node 735.

Biasing provided by devices 793 at node 727 biases P-type semiconductor 710 to allow a current flow from node 733 to third output 784. Biasing provided by devices 793 at node 727 biases P-type semiconductor 724 to allow a current flow from node 735 to fourth output 786. Current flow provided at input 730 ($I_{CH}$) is added to the current flow provided to node 733 by semiconductor device 708 and leaving node 733 through semiconductor device 710. Current flow provided at input 732 ($I_{CL}$) is added to the current flow provided to node 735 by semiconductor device 722 and leaving node 735 through semiconductor device 724.

Biasing of semiconductor devices 708, 710, 722, and 724 is determined by devices 793 so that at a particular predetermined temperature or temperature range, the current flows through semiconductor devices 708, 710, 722, and 724 will be such that four-quadrant input circuit 700 provides the desired output current flows in response to the received current flows at input 730 and input 732. However, in various applications a temperature in which four-quadrant input circuit 700 is operating within may increase. For example, the ambient temperature of the environment in which four-quadrant input circuit 700 is operating within can increase. Such an increase in temperature may be a result of an increase in the temperate of the environment in which four-quadrant input circuit 700 is operating within. As the temperature of four-quadrant input circuit 700 increases, the voltage thresholds required to bias semiconductor devices 708, 710, 722, and 724 to a given level of conductance decreases. As a result, at higher temperatures, current flows to outputs 780, 782, 784, and 786 may increase, and result in levels of output current flows from circuit 700 that are more than the current flows that should be provided at outputs 780, 782, 784, and 786 in view of the current flows provided at inputs 730 and 732. In other words, an output error is introduced by the increased temperature in which circuit 700 is operating. If the error is large enough, it could result in an output level of current being provided by circuit 700 that would be indicative a data state different from the data state that would be indicated by the current flows at input 730 and input 732.

In order to compensate for these threshold voltage changes, P-starve semiconductor 790 can be regulated so as to reduce the voltage provide at the first terminal of resistive load 750 at node 725. In various examples, a control voltage ($V_{P\-starve}$) is provided by source 717 to the gate of semiconductor device 790. By reduction the conductance of P-starve semiconductor device 790 through the control voltage applied to the gate, a voltage drop is provided between voltage supply $V_{DD}$ and node 725. As a result, a voltage less than the voltage provided by supply voltage $V_{DD}$ is provided at node 725. In a similar manner, to compensate for these threshold voltage changes, N-starve semiconductor 792 can be regulated so as to increase the voltage provide at the connection between the second terminal of resistive load 752 and ground, referring to node 723. In various examples, a control voltage ($V_{N\-starve}$) is provided by $V_{N\-starve}$ source 715 to the gate of semiconductor 792. By reducing the conductance of N-starve semiconductor device 792 through the control voltage applied to the gate, a voltage drop is provided across N-starve semiconductor device 792, raising the voltage level at node 723. As a result, a voltage provided at node 723 is greater than the voltage that would exist on node 723 if node 723 were coupled directly to ground. In various examples, the level of the control voltages provided by sources 717 and 715 is based on the ambient temperature in which circuit 700 is operating, and thus sources 717 and 715 are operable to provide a control voltage to the gates of the Pstarve semiconductor 790 and the Nstarve semiconductor 792 as a function of the ambient temperature in which circuit 700 is operating.

When sources 717 and 715 provide bias voltages to semiconductors devices 790 and 792 respectively that cause voltage drops across these devices to exist, the overall voltage differential between nodes 725 and 723 is reduces, thus reducing the current flow through the series connected string of devices 793, and resulting in a reduction in bias voltages provided by the series connected string of devices 793 to each of semiconductor devices 708, 710, 722, and 724. This reduced bias voltage provided to semiconductor devices 708, 710, 722, and 724 compensates for the reduced bias thresholds of semiconductor devices 708, 710, 722, and 724 resulting from the increased temperature, and thus maintains the desired current flows at outputs 780, 782, 784, and 786 for the provided input flows at inputs 730 and 732 despite the increased temperature environment in which four-quadrant input circuit 700 is operating within.

In various examples, four-quadrant input circuit 700 as illustrated in FIG. 7 is the four-quadrant input circuit 422 illustrated in FIG. 4, wherein four-quadrant input circuit 422 includes the biasing circuit 793 as described above and illustrated in FIG. 7, and thus includes the temperature biasing compensation provided by devices 793 as described above.

Figure 8:
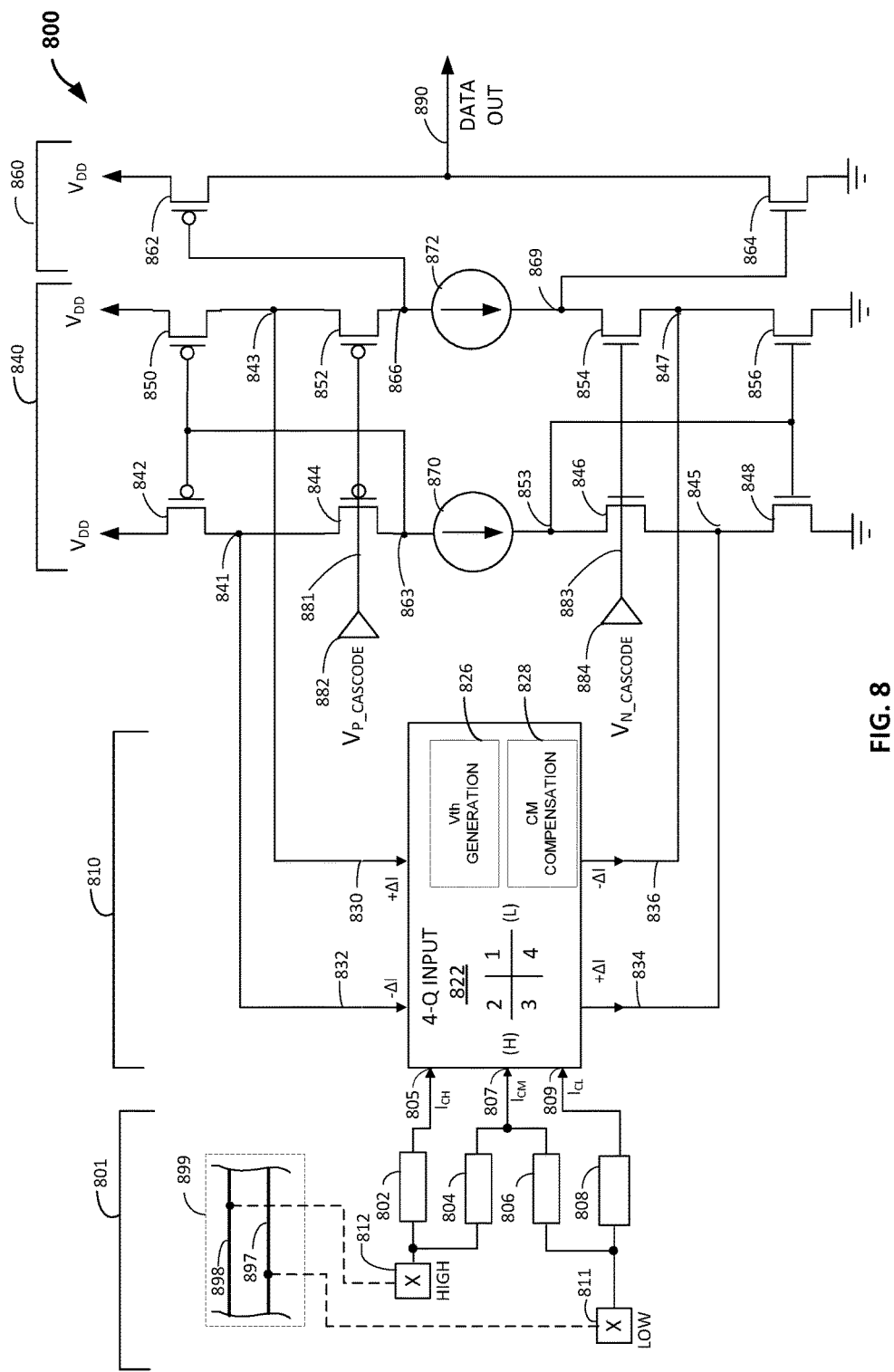
FIG. 8 is a schematic diagram of a bus receiver system in accordance with one or more aspects of the present disclosure.

FIG. 8 illustrates a schematic diagram of a receiver system 800 in accordance with one or more example techniques described in this disclosure. The receiver system 800 as described herein represents one or more examples of a receiver systems that can be used as a receiver located in a node, such as one or more of nodes 110, 112, through 120 as shown in the system 100 of FIG. 1, and as the receiver included in the transceiver 224 of node 210 as shown in system 200 of FIG. 2, and as receiver included in transceiver 324 of node 310 as show in FIG. 3. It would be understood that various examples of receiver system 800 could be used in a receiver in various system having nodes coupled to a bus system, and are not limited to the examples illustrated by system 100, system 200, or node 310 as described herein.

As illustrated in FIG. 8, system 800 includes an input stage 810 coupled to a gain stage 840. In various examples, input stage 810 includes a four-quadrant input circuit 822. In various examples, gain stage 840 includes a folded cascode amplifier. As illustrated, a four-quadrant input circuit 822 includes a first input 805 ($I_{CH}$), a second input 809 ($I_{CL}$), and a third input 807 ($I_{CM}$). Four-quadrant input circuit 822 further includes a first output 830, a second output 832, a third output 834, and a fourth output 836. In various examples, four-quadrant input circuit 822 is operable to be coupled to a bus 899 through an input coupling circuit 801. Input coupling circuit 801 includes a first input 812 operable to be coupled to a first conductor 898 of bus 899, and a second input 811 operable to be coupled to a second conductor 897 of bus 899. As illustrated, first input 812 is coupled to first input 805 of the four-quadrant input circuit 822 through resistive load 802, and second input 811 is coupled the second input 809 of four-quadrant input circuit 822 through resistive load 808. In various examples, input coupling circuit 801 couples the four-quadrant input circuit 822 to a CAN-bus or a HS-CAN bus, wherein first input 812 is coupled to the CAN-High conductor 898, and second input 811 is coupled to the CAN-Low conductor 897 of bus 899. However, examples of the bus 899 to which input coupling circuit 801 is operable to be coupled to are not limited to a CAN-bus or to a HS-CAN bus, and can include various types of busses having two-conductors forming the bus structure. In addition, as illustrated input 807 ($I_{CM}$) is coupled to the first input 812 through resistive load 804, and in parallel input 807 ($I_{CM}$) is coupled to the second input 811 through resistive load 806. As noted above, in various examples the first input 812 is coupled to the CAN-H conductor 898 in bus 899 of a CAN-BUS system, and the second input 811 is coupled to the CAN-L conductor 897 of the CAN-BUS system, although the system 800 is not limited to being operable to be coupled to a CAN-BUS, and in various examples is coupled to any type of differential bus system having a two-conductor implementation. In various examples, resistive load 804 and 806 provide resistive loads having a same resistive value respectively, and are configured to provide a current representative of common mode current relative to the current provided to first input 805 ($I_{CH}$) and the current provided to second input 809 ($I_{CL}$) of four-quadrant input circuit 822.

In various examples, based on having a third (common mode current) input 807, four-quadrant input circuit 822 is operable to compensate for common mode voltage that exists on the bus to which system 800 is operable to be coupled. As illustrated, various examples of four-quadrant input circuit 822 include Common Mode (CM) compensation circuit 828. Further details regarding the feature of common mode voltage level compensation is described herein with respect to FIG. 6. In various examples, four-quadrant input circuit 822 provides threshold level generation as a built-in feature of the circuit. As illustrated, various examples of four-quadrant input circuit 822 include Vth generation circuit 826. Further details regarding threshold level generation is described herein with respect to FIG. 6. In various examples, four-quadrant input circuit 822 provides hysteresis as a built in feature of the circuit. In various examples, four-quadrant input circuit 822 is the four-quadrant input circuit 522 illustrated and described with respect to FIG. 5, and incorporates the features of four-quadrant input circuit 522 as described in this disclosure with respect to FIG. 5.

In system 800 as illustrated, in FIG. 8, first output 830 is coupled to node 843 of the folded cascode amplifier 840, second output 832 is coupled to node 841 of the folded cascode amplifier 840, third output 834 is coupled to node 845 of folded cascode amplifier 840, and fourth output 836 is coupled to node 847 of folded cascode amplifier 840. Folded cascode amplifier 840 includes a first series connected string of devices including P-type semiconductor 842 coupled to voltage supply $V_{DD}$, P-type semiconductor 844, current source 870, and N-type semiconductors 846 and 848, including N-type semiconductor 848 being coupled to ground, as shown in FIG. 8. Folded cascode amplifier 840 includes a second string of series connected devices including P-type semiconductor 850 coupled to voltage supply $V_{DD}$, P-type semiconductor 852, current source 872, and N-type semiconductors 854 and 856, including N-type semiconductor 856 being coupled to ground, as shown in FIG. 8. As illustrated, the gates of P-type semiconductors 842 and 850 are coupled to node 863, and the gates of N-type semiconductors 848 and 856 are coupled to node 853. In addition, the gates of P-type semiconductors 844 and 852 are coupled to $V_{P\_cascode}$ input 882 through node 881, and the gates of N-type semiconductors 846 and 854 are coupled to $V_{N\_cascode}$ input 884 through node 883.

In various examples, folded cascode amplifier 840 is coupled to output amplifier 860. As illustrated, output amplifier 860 includes a push-pull amplifier including P-type semiconductor 862 coupled to $V_{DD}$ and data output 890, and a gate coupled to node 866 of folded cascode amplifier 840, and N-type semiconductor 864 coupled to ground and to data output 890, and a gate coupled to folded cascode amplifier at node 869. However, the output amplifier is not limited to a push-pull amplifier, and can include other types of amplifiers operable for providing voltage level outputs at data output 890.

In operation, four-quadrant input circuit 822 receives current inputs at first input 805 and second input 809 based on voltage differentials provided at input 812 and 811 from bus 899. In addition, four-quadrant input circuit 822 receives a current flow at input 807 based on a common mode voltage received at inputs 812 and 811 present on bus 899. Four-quadrant input circuit 822 is operable to provide current sinking at first output 830 and output 832 based on the difference in current flows received at input 805 and 809, compensated for common mode current received at input 807. Similarly, four-quadrant input circuit 822 is operable to source current from output 834 and output 836 based on the difference in current flows received at input 805 and input 809, compensated for common mode current received at input 807. The current flows to first output 830 and second output 832 are provided by the folded cascode amplifier 840 from nodes 843 and 841 respectively, and induce a current flow in folded cascode amplifier 840 that is controlled by the input voltage at $V_{P\_cascode}$ input 882, and provided to current sources 870 and 872 respectively. The current flows from third output 834 and fourth output 836 are provided to the folded cascode amplifier 840 at nodes 845 and 847 respectively, and induce a current flow in folded cascode amplifier 840 that is controlled by the input voltage at $V_{N\_cascode}$ input 884, and provides current sinks for current sources 870 and 872 respectively. These amplified current flows in folded cascode amplifier 840 correspond to the output current flows provided to outputs 830, 832, and from outputs 834, and 836 of four-quadrant input circuit 822, and thus correspond to the voltage differential levels provided at inputs 812 and 811. The current flows provided in folded cascode amplifier 840 are coupled to output amplifier 860. Output amplifier 860 converts the varying levels of current flow provided by folded-cascode amplifier 840 into corresponding voltage level outputs at data output 890. The voltage level output provided at output 890 correspond to a first data state or a second data state being provided at inputs 812 and 811 from bus 899. Advantages of the device of system 800 include symmetry and high gain.

Figure 9:
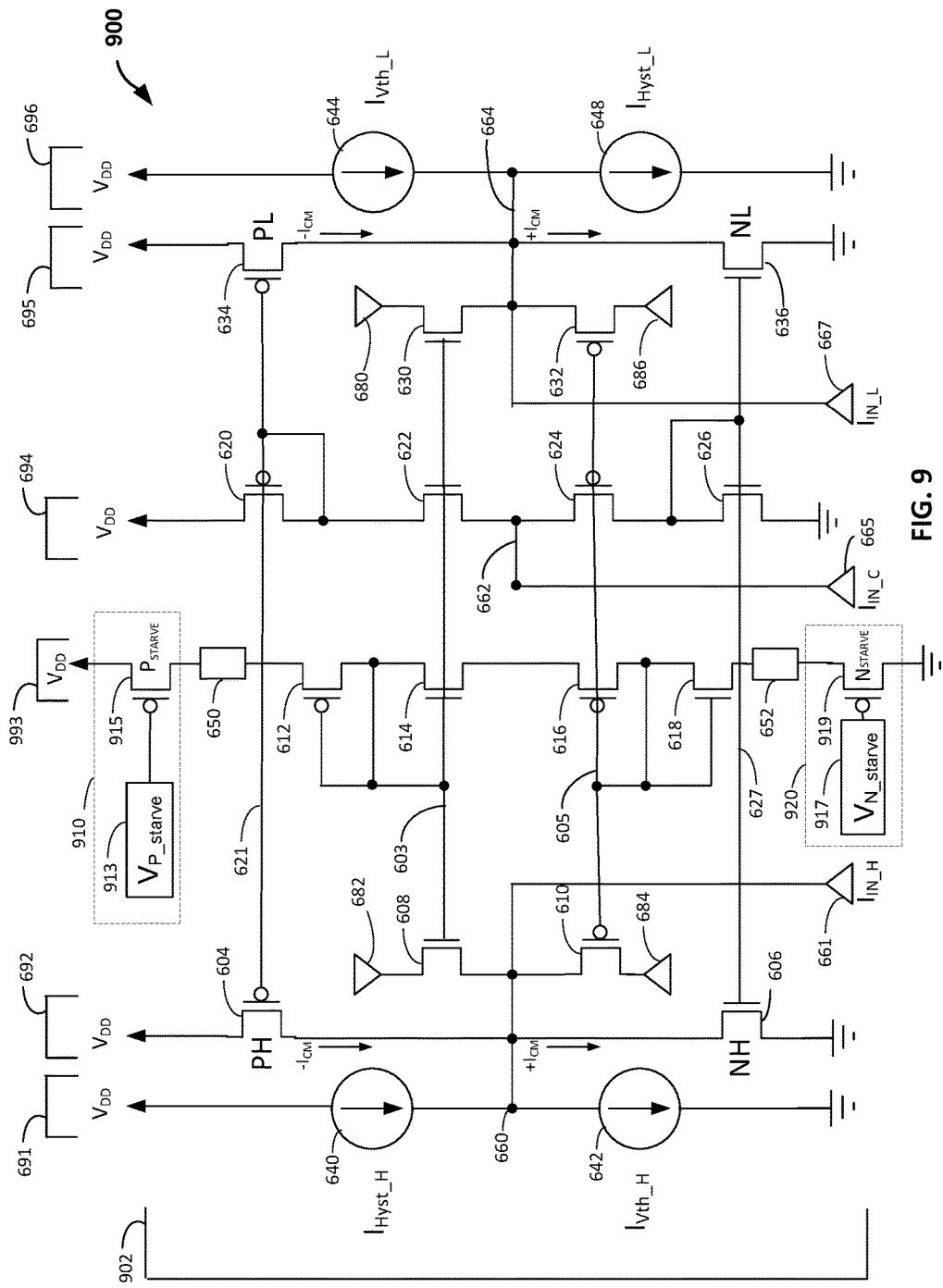
FIG. 9 is a schematic diagram of a four-quadrant input circuit in accordance with one or more aspects of the present disclosure.

FIG. 9 is a schematic diagram of a four-quadrant input circuit 900 in accordance with one or more aspects of the present disclosure. As shown in FIG. 9, device 900 includes a four-quadrant input circuit 902. Four-quadrant input circuit 902 includes a four-quadrant input circuit similar to four-quadrant input circuit 602 as illustrated in FIG. 6, with the differences as described below. Elements included in four-quadrant input circuit 902 that correspond to the same elements in the four-quadrant input circuit 602 of FIG. 6 retain the same reference number (600 level number) as used to designate the element in FIG. 6. All features of four-quadrant input circuit 602 as described in this disclosure and the equivalents thereof are included in various examples of four-quadrant input circuit 902.

In addition, four-quadrant input circuit 902 includes a biasing circuit 993 that includes P-starve circuit 910 and N-starve circuit 920. In various examples, biasing circuit 993 replaces in system 900 the series connected string of devices 693 used by four-quadrant input circuit 602 of FIG. 6. As illustrated in FIG. 9, biasing circuit 993 included a series connected string of devices arranged as follows. P-starve circuit 910 includes P-starve semiconductor 915 having a first terminal coupled to voltage supply $V_{DD}$, a second terminal coupled to a first terminal of resistive load 650, and a gate coupled to a voltage source 913. Voltage source 913 is operable to provide a control voltage ($V_{P\_starve}$) to the gate of P-type semiconductor device 915. Further, as noted above the biasing circuit 993 includes N-starve circuit 920. N-starve circuit 920 includes N-starve semiconductor 919 having a first terminal coupled to a terminal of resistive load 652, a second terminal coupled to ground, and a gate coupled to a voltage source 917. Voltage source 917 is operable to provide a control voltage ($V_{N\_starve}$) to the gate of N-type semiconductor 919.

In operation, P-type semiconductor 915 can be regulated by voltage source 913 in order to decrease the current flow through biasing circuit 993. Similarly, N-type semiconductor 919 can be regulated by voltage source 917 in order to decrease the current flow through biasing circuit 993. By reducing the current flow through biasing circuit 993, the biasing voltages provided to the gates of semiconductor devices 608, 610, 630, 632, 622, and 624 are reduced. By providing voltage regulation to P-starve 915 and N-starve 919 of the biasing circuit 993 in response to increases in the temperature (operating or ambient) in which four-quadrant input circuit 902 is operating within, the reduction in the threshold voltages of semiconductor devices 608, 610, 630, 632, 622, and 624 due to increased temperatures can be compensated for by the lowered biasing voltages. As a result, the desired current control at outputs 680, 682, 684, and 686 can be maintained despite these temperature increases. It would be understood that in examples that include these starve circuits, variations could include using only P-starve circuit 910, using only N-starve circuit 920, or using both P-starve circuit 910 and N-starve circuit 920.

Figure 10:
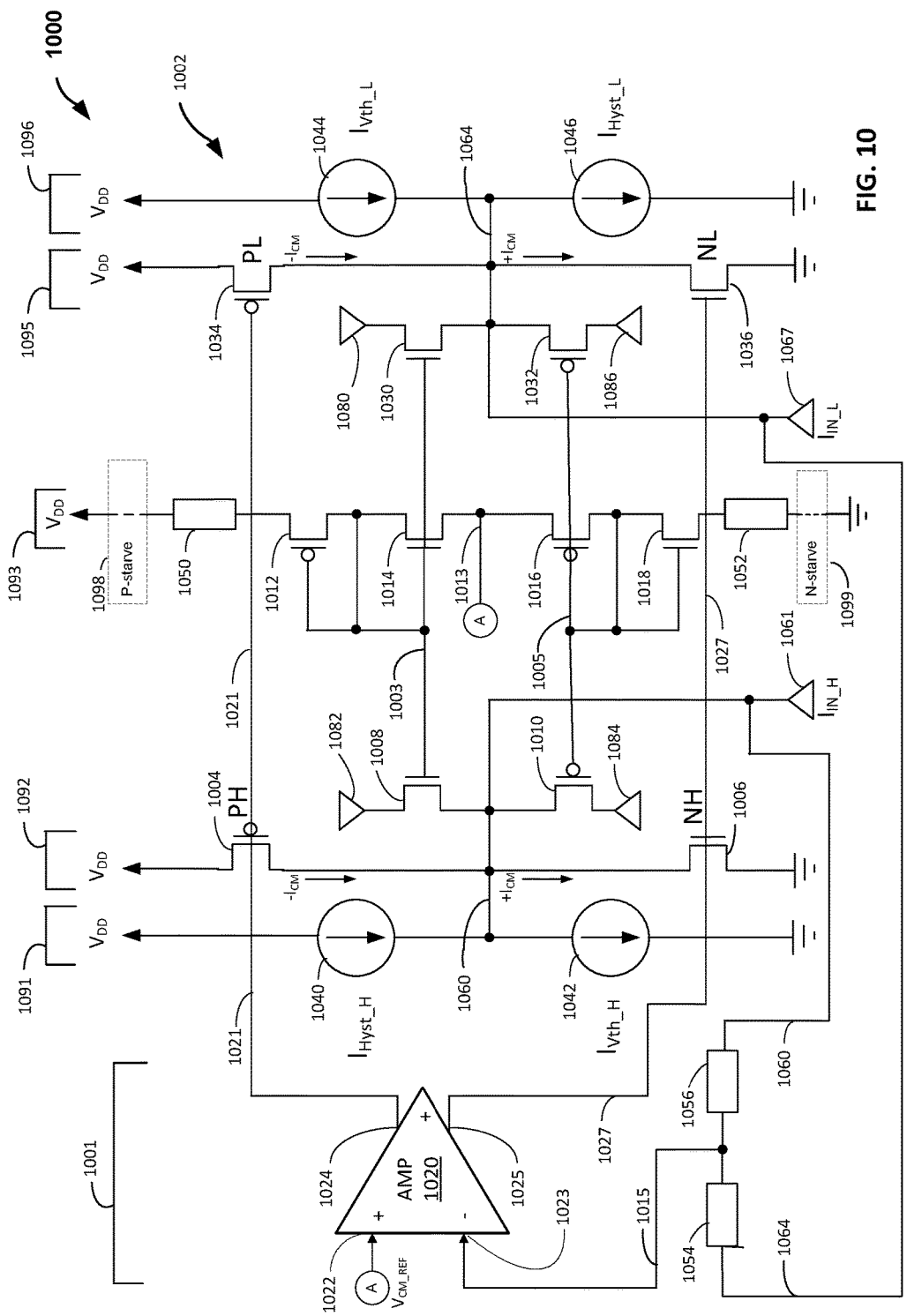
FIG. 10 is a schematic diagram of a bus receiver system in accordance with one or more aspects of the present disclosure.

FIG. 10 is a schematic diagram of a bus receiver system 1000 in accordance with one or more aspects of the present disclosure. As shown in FIG. 10, receiver 1000 includes an advanced four-quadrant input circuit 1002. As illustrated, four-quadrant circuit 1002 includes a first input 1061 ($I_{IN\_H}$), a second input 1067 ($I_{IN\_L}$). As illustrated, four-quadrant input circuit 1002 also includes a first output 1080, a second output 1082, a third output 1084, and a fourth output 1086. N-type semiconductor device 1008 includes a first terminal coupled to second output 1082, a second terminal coupled to node 1060, and a gate coupled to node 1003. P-type semiconductor device 1010 includes a first terminal coupled to node 1060, a second terminal coupled to third output 1084, and a gate coupled to node 1005. In various examples of device 1000, first input 1061 ($I_{IN\_H}$) is coupled to node 1060. N-type semiconductor device 1030 includes a first terminal coupled to first output 1080, a second terminal coupled to node 1064, and a gate coupled to node 1003. P-type semiconductor device 1032 includes a first terminal coupled to node 1064, a second terminal coupled to fourth output 1086, and a gate coupled to node 1005. In various examples of device 1000, second input 1067 ($I_{IN\_L}$) is coupled to node 1064.

A first series connected string of devices 1093 is included in circuit 1002, arranged as follows. In various examples, resistive load 1050 includes a first terminal coupled to supply voltage $V_{DD}$, and a second terminal coupled to a first terminal of P-type semiconductor device 1012. P-type semiconductor device 1012 includes a second terminal coupled to a first terminal of N-type semiconductor device 1014, and a gate coupled to node 1003. In addition, the second terminal of P-type semiconductor device 1012 and the first terminal of N-type semiconductor device 1014 are coupled to node 1003. N-type semiconductor device 1014 includes a second terminal coupled to a first terminal of P-type semiconductor device 1016, and a gate coupled to node 1003. P-type semiconductor device 1016 includes a second terminal coupled to a first terminal of N-type semiconductor device 1018, and a gate coupled to node 1005. In addition, the second terminal of P-type semiconductor device 1016 and the first terminal of N-type semiconductor device 1018 are coupled to node 1005. N-type semiconductor device 1018 includes a second terminal coupled to a first terminal of resistive load 1052, and a gate coupled to node 1005. In various examples, resistive load 1052 includes a second terminal coupled to ground.

In various examples, first series connected string of devices 1093 provides biasing voltages for the gates of semiconductor devices 1008, 1010, 1030, and 1032 in a similar manner as previously described with respect to biasing circuit 693 shown in FIG. 6. In addition, in a manner similar to that described with respect to biasing circuit 993 as shown in FIG. 9, biasing circuit 1093 as shown in FIG. 10 in various examples includes P-starve circuit 1098 and N-starve circuit 1099. In various examples, P-starve circuit is P-starve circuit 910 as shown and described with respect to FIG. 9, and N-starve circuit 1099 is N-starve circuit 920 as shown and described with respect to FIG. 9. In various examples, in the alternative to resistive load 1050 being coupled directly to voltage supply $V_{DD}$, resistive load 1050 is coupled to $V_{DD}$ through P-starve circuit 1098. In various examples, P-starve circuit is the same circuit as illustrated and described above in FIG. 9 as P-starve circuit 910, and operates to reduce current flow to biasing circuit 993 based on temperature increases in a same manner as described above with respect to P-starve circuit 910. In various examples, in the alternative to resistive load 1052 being coupled directly to ground, resistive load 1052 is coupled to ground through N-starve circuit 1099. In various examples, N-starve circuit is the same circuit as illustrated and described above in FIG. 9 as N-starve circuit 920, and operates to reduce current flow to biasing circuit 993 based on temperature increases in a same manner as described above with respect to N-starve circuit 920. It would be understood that in examples that include these starve circuits, variations could include using only P-starve circuit 1098, using only N-starve circuit 1099, or using both P-starve circuit 1098 and N-starve circuit 1099.

In various examples, a second string of one or more devices 1091 is included in circuit 1002, and are connected as follows. Current source 1040 ($I_{HYST\_H}$) includes a first terminal coupled to supply voltage $V_{DD}$, and a second terminal coupled to node 1060. In various examples, current source 1040 ($I_{HYST\_H}$) is configured to source current to node 1060. A second current source 1042 ($I_{Vth\_H}$) includes a first terminal coupled to node 1060, and a second terminal coupled to ground. In various examples, second current source 1042 ($I_{Vth\_H}$) is operable to sink current from node 1060 to ground. In various examples, a third string of one or more devices 1096 is included in circuit 1002, and are connected as follows. Current source 1044 ($I_{Vth\_L}$) includes a first terminal coupled to supply voltage $V_{DD}$, and a second terminal coupled to node 1064. In various examples, current source 1044 ($I_{Vth\_L}$) is configured to source current to node 1064. A second current source 1046 ($I_{HYST\_L}$) includes a first terminal coupled to node 1064, and a second terminal coupled to ground. In various examples, second current source 1046 ($I_{HYST\_L}$) is operable to sink current from node 1064 to ground.

In various examples, current sources 1040, 1042, 1044, and 1046 are operable to provide threshold voltage level settings for switching points for outputs 1080, 1082, 1084, and 1086, thus providing the Vth generation circuit for the four-quadrant input circuit 1002 as described herein with respect to the Vth generation circuit 526 as shown in FIG. 5 and as described with respect to current sources 640, 642, 644, and 648 as shown and described with respect to FIG. 6. In various examples, current sources 1040 and 1046 are operable to provide hysteresis with respect to the setting of the threshold voltage levels provided for the switching points for outputs 1080, 1082, 1084, and 1086 in a manner similar to current sources 640 and 648 as shown and described with respect to FIG. 6. In various examples, four-quadrant input circuit 1002 includes the features and functions provided by Vth generation circuit 526 of FIG. 5 and as described in FIG. 6.

In various examples, a fourth series connected string of devices 1092 is included in circuit 1002 and is connected as follows. A first terminal of P-type semiconductor device 1004 (PH) is coupled to supply voltage $V_{DD}$. P-type semiconductor device 1004 (PH) includes a second terminal coupled to a first terminal of N-type semiconductor device 1006 (NH) at node 1060, and a gate coupled to node 1021. N-type semiconductor device 1006 (NH) includes a second terminal coupled to ground, and a gate coupled to node 1027. A fifth series connected string of devices 1095 is included in circuit 1000, and is connected as follows. A first terminal of P-type semiconductor device 1034 (PL) is coupled to supply voltage $V_{DD}$. P-type semiconductor device 1034 (PL) includes a second terminal coupled to a first terminal of N-type semiconductor device 1036 (NL) at node 1064, and a gate coupled to node 1021. N-type semiconductor device 1036 includes a second terminal coupled to ground, and a gate coupled to node 1027.

In a manner similar to that described with respect to circuit 602, semiconductors 1004, 1006, 1034, and 1036 are operable to provide currents to and from nodes 1060 and 1064 in order to compensate for common mode currents present at inputs 1061 and 1067 of circuit 1002. For example, as illustrated in FIG. 10, when a positive common mode current is present between inputs 1061 and 1067, semiconductor device 1006 (NH) is operable to sink a positive common mode compensation current $+I_{CM}$ from node 1060, and semiconductor device 1036 (NL) is operable to sink a positive common mode compensation current $+I_{CM}$ from node 1064, thus removing from outputs 1080, 1082, 1084, and 1086 any excess current that would result from the common mode current present at input 1061 and 1067. When a negative common mode current is present between inputs 1061 and 1067, semiconductor device 1004 (PH) is operable to source a negative common mode compensation current $-I_{CM}$ to node 1060, and semiconductor device 1034 (PL) is operable to source a negative common mode compensation current $-I_{CM}$ to node 1064, thus adding currents to outputs 1080, 1082, 1084, and 1086 that would otherwise be missing as a result the common mode current present at input 1061 and 1067. In this manner, circuit 1002 is operable to provide compensation for any common mode currents present at inputs 1061 and 1067 as a function provided within circuit 1002. However in contrast to for example circuit 602 as illustrated in FIG. 6, circuit 1002 as illustrated in FIG. 10 provides active biasing to semiconductors 1008, 1010, 1030, and 1032, instead of the passive biasing utilized by circuit 602. Also in contrast to circuit 602, circuit 1002 detects common mode current using the active biasing circuit further described below, and therefore does not require a third input (such as third input 665 of circuit 602) in order to compensate for common mode current, and also eliminates the need for the separate series connected string of biasing devices, such as biasing circuit 694 utilized by circuit 602 as illustrated in FIG. 6.

As illustrated in FIG. 10, circuit 1002 includes an active input stage 1001 including amplifier 1020. Active input stage 1001 in various examples is configured to be coupled to circuit 1002 as follows. As illustrated, amplifier 1020 includes a non-inverting input 1022, an inverting input 1023, a first output 1024 coupled to node 1021, and a second output 1025 coupled to node 1027. As illustrated, the non-inverting input 1022 is coupled to node 1013 ($V_{CM, Ref}$) located at the coupling of the second terminal of N-type semiconductor device 1014 and the first terminal of P-type semiconductor device 1016. As illustrated, the inverting input 1023 of amplifier 1020 is coupled to node 1015, node 1015 formed by the second terminal of resistive load 1054 being coupled to the second terminal of resistive load 1056. As illustrated, the first terminal of resistive load 1054 is coupled to node 1064 and second input 1067 ($I_{IN\_L}$), and the first terminal of resistive load 1056 is coupled to node 1060 and to first input 1061 ($I_{IN\_H}$). As such, inverting input 1023 is operable to receive a common mode current relative to the voltages provided at first input 1061 ($I_{N\_H}$) and second input 1067 ($I_{N\_L}$).

In operation, series connected string of devices 1093 provides bias voltages for each of semiconductor devices 1008 and 1010, thus controlling current flows between node 1060, second output 1082, and third output 1084, and provides bias voltage for semiconductor devices 1030 and 1032, thus controlling current flows between node 1064, first output 1080, and fourth output 1086. In a manner similar to the examples described above with respect to circuit 602, circuit 1002 is operable to set outputs 1080, 1082, 1084, and 1086 to a first state representative of a first data state when the currents provided at inputs 1061 and 1067 are representative of a voltage different representative of the first data state, and to set outputs 1080, 1082, 1084, and 1086 to a second state, different from the first state, the second state representative of a second data state when the currents provided at inputs 1061 and 1067 are representative of a voltage different representative of the second data state. In addition, as described above current sources 1040, 1042, 1044, and 1046 as illustrated in circuit 1002, are operable to provide setting of the switching points for outputs 1080, 1082, 1084, and 1086 with respect to the threshold differential voltages, represented by current flows at inputs 1061 and 1067, when transitioning from providing a output representative of the first data state to an output representative of the second data state, and when transitioning from providing an output representative of the second data state back to an output representative of the first data state.

In addition, amplifier 1020 provides a bias voltage from output 1024 to P-type semiconductor (PH) 1004 and P-type semiconductor (PL) 1034. Amplifier 1020 also provides bias voltages from output 1025 to N-type semiconductor (NH) 1006, and to N-type semiconductor (NL) 1036. Output voltage levels provided at outputs 1024 and 1025 of amplifier 1020 are determined based on the voltage differential provided at node 1015 to inverting input 1023 of amplifier 1020, and the $V_{CM\_REF}$ voltage at node 1013 as provide to the non-inverting input 1022 of amplifier 1020. This arrangement allows amplifier 1020 to provide active gain adjustment to compensate for common mode voltage provided between first input 1061 and input second 1067, without the need for a third input to circuit 1002, and provides much faster common mode voltage compensation compared to a circuit using passive biasing for the semiconductors used to provide the common mode current compensation in a four-quadrant input circuit.

Advantages of system 1000 include all the advantages described with respect to four-quadrant input circuit 522 of FIG. 5, including the features and functions of the CM compensation circuit 528 and the Vth generation circuit 526 of circuit 522 being also built into circuit 1002, along with temperature compensation as described in with respect to FIG. 9. In addition, circuit 1002 provides the added advantages of no requiring a third input to the 1002 circuit and a extras string of biasing circuit devices in order to provide common mode voltage compensation, and faster and more accurate compensation of common mode current provided on the inputs to circuit 1002.

FIG. 11 is a graphical diagram 1100 illustrative of example electrical parameters in accordance with one or more techniques described in the present disclosure. Graphical illustration 1100 includes a first graph 1101 including a vertical axis 1110 representing voltage levels, and a horizontal axis 1115 representing time. Graphical illustration 1100 includes a second graph 1102 including a vertical axis 1120 representing voltage difference, and a horizontal axis 1125 representing time. Graphical illustration 1100 includes a third graph 1160 including a vertical axis 1161 representative of the voltage level being provided at a data output, and a horizontal axis 1165 representative of time.

First graph 1101 includes a depiction of voltage levels of a first signal 1112 over time, and voltage levels of a second signal 1114 over time. Voltage level 1111 represents a supply voltage level $V_{DD}$, which would be a maximum voltage level that could occur on first signal 1112 and second signal 1114, and the voltage level at horizontal axis 1115 would represent a minimum voltage level that could occur on first signal 1112 and second signal 1114. Dashed line 1113 represents an intermediary voltage level. Second graph 1102 includes a voltage differential signal 1122 that indicates a level of voltage difference, over time, between a voltage level of the first signal 1112 and a voltage level of second signal 1114. As shown in second graph 1102, voltage differential level 1131 represents the largest differential voltage that can occur between the first voltage signal 1112 and the second signal 1114. An axis at the level of horizontal axis 1125 represents a voltage differential signal level when there is no difference, or substantially no voltage difference, exists between the voltage levels present on first signal 1112 and second signal 1114. Third graph 1160 represents a change in the voltage level trace 1166 provided at a data output, such as but not limited to data output 465 shown in FIG. 4, data output 565 shown in FIG. 5, and data output 890 as shown in FIG. 8. As shown in FIG. 11, voltage level trace 1166 can vary between a low or a zero voltage level represented by voltage level 1162, to a higher voltage level represented by voltage level 1164. In various examples, voltage level 1162 is representative of a first data state, and voltage level 1164 is representative of a second data state.

As illustrated, during a first time period 1103, the voltage levels for both first signal 1112 and second signal 1114 are at voltage level 1113, and so the voltage differential level depicted on graph 1102 during time period 1103 is at the minimum level, and voltage differential signal 1122 falls within box 1140. Box 1140 indicates voltage differential levels that represent a first data state, such as but not limited to a "RECESSIVE" data state, as shown on graph 1102. During time period 1104 that begins at time 1106 and ends at time 1108, the voltage of first signal 1112 increases to a voltage level above voltage level 1113 and less than the voltage level 1111, and the voltage level of second signal 1114 decreased to voltage level less than voltage level 1113 but above the voltage level represented at horizontal axis 1115, generating a voltage level difference 1116. As shown on graph 1102, voltage level difference 1116 caused the voltage differential signal 1122 to exceed a threshold voltage 1132 of box 1130, wherein voltage level differentials that exceed threshold voltage level 1132 are considered representative of a second data state, such as but not limited to the "DOMINANT" data state as shown on graph 1102. In time period 1105, the voltage of first signal 1112 and second signal 1114 return to a voltage level at or substantially at voltage level 1113. As a result, the voltage difference level, represented by arrows 1118, returns to a level below the threshold voltage 1142 associated with box 1140. Once the voltage differential signal 1122 returns to a level below threshold voltage level 1142, the signal 1122 is representative of the first data state.

In various examples, variations in the voltage differential levels can be representative of a first data state and a second data state as described herein. In various examples, first signal 1112 is representative of signals provided on a first conductor, and second signal 1114 is representative of signals provided on a second conductor of any of busses 130, 230, 330, 499, 599, 899, and any other bus structures as described herein. In various examples, voltage levels described are voltage levels compliant with HS-CAN bus data transmission levels. In various examples, voltage level 1111 represents a supply voltage level $V_{DD}$ is 5 volts, minimum voltage along axis 1115 is zero volts, common mode voltage is 2.5 volts, maximum difference voltage while still in the "Recessive" state (as represented by threshold 1142 of box 1140) is 0.5 volts, and minimum threshold voltage different to be recognized as the "DOMINATE" data state (as represented by threshold 1132 of box 1130) is 1.5 volts. In various examples, voltage level 1111 represents a supply voltage level $V_{DD}$ is 3.3 volts, minimum voltage along axis 1115 is zero volts, common mode voltage is 2.3 volts, maximum difference voltage while still in the "RECESSIVE" state (as represented by threshold 1142 of box 1140) is 0.5 volts, and minimum threshold voltage different to be recognized as the "Dominate" data state (as represented by threshold 1132 of box 1130) is 1.5 volts.

As illustrated by graph 1160, at time 1150, the voltage differential 1116 has increased to a voltage differential level that exceeds threshold 1132, and a receiver system, such as but not limited to system 400 as shown in FIG. 4, system 500 as shown in FIG. 5, system 800 as shown in FIG. 8, will begin transitioning from providing the voltage level 1162 at a data output to providing the voltage level 1164 at the data output, as shown by voltage level trace 1166. Time period 1170 represents a time period between time 1150 when the voltage differential excessed threshold 1132 and when voltage level output 1166 is provided at the data output. In various examples, the methods and systems, and devices described in this disclosure are operable to provide a time period 1170 of less than 25 nanoseconds. As further illustrated by graph 1160, at time 1152, the voltage differential 1116 has decreased to a voltage differential level that is less than threshold 1142, and a receiver system will begin transitioning from providing the voltage level 1164 at a data output to again providing the voltage level 1162 at the data output, as illustrated by voltage level trace 1166. Time period 1172 represents a time period between time 1152 when the voltage differential became less than threshold 1142 and when voltage level 1162 is again provided at the data output. In various examples, the methods and systems, and devices described in this disclosure are operable to provide a time period 1172 of less than 25 nanoseconds.

Figure 12:
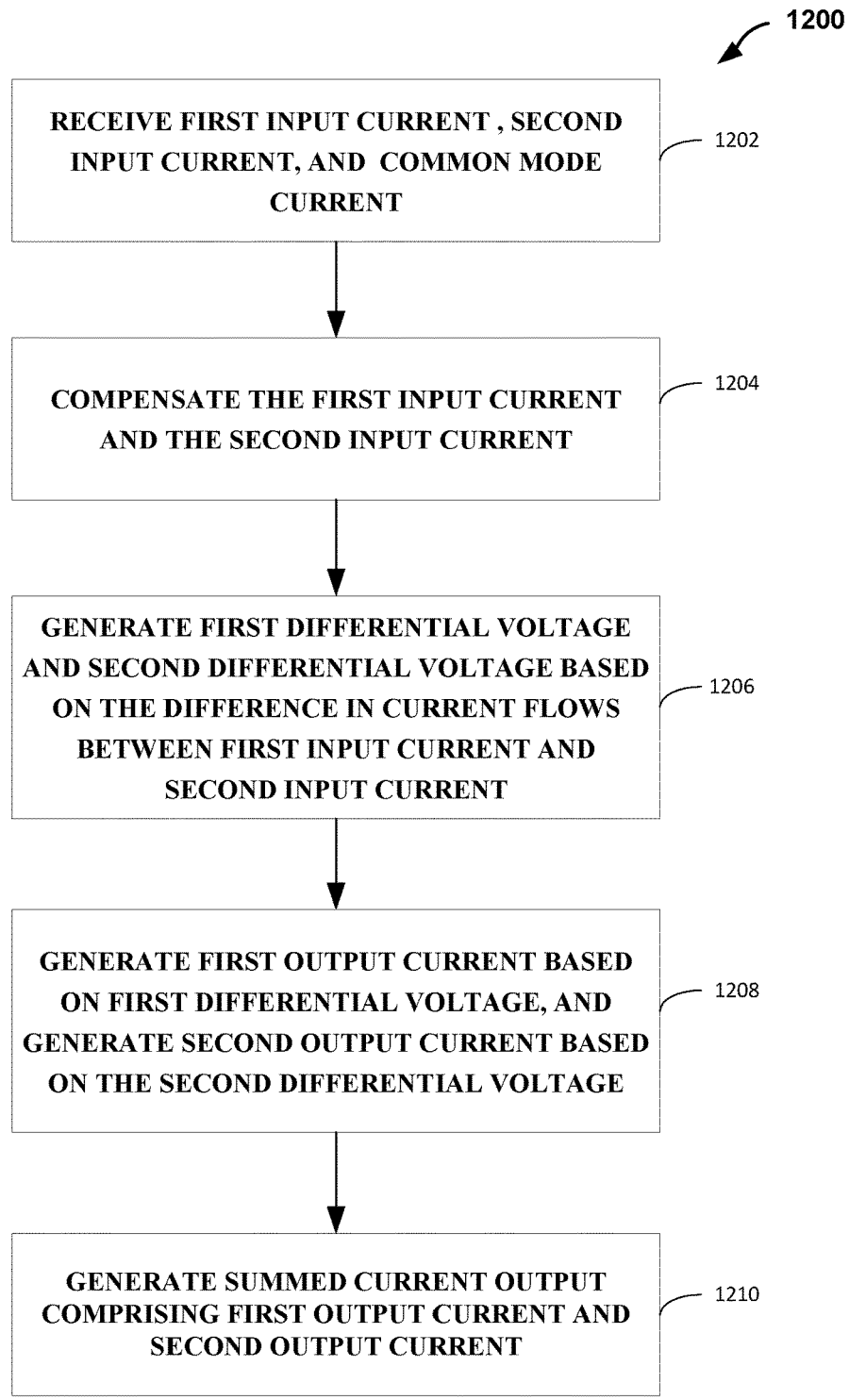
FIG. 12 is a flowchart illustrating various methods in accordance with the techniques described in the present disclosure.

FIG. 12 is a block diagram 1200 illustrating one or more methods according to various techniques described in this disclosure, and the equivalents thereof. In various examples, the one or more methods include systems and circuits, such as four-quadrant input circuits 522, 602, 822, 902 and 1002 that are operable to receive a first input current, a second input current, and a common mode current at a bus receiver including a four-quadrant input circuit (1202). In various examples, the one or more methods include circuits operable to compensate the first input current and the second input current based on the received common mode current. (1204). In various examples, the one or more methods include the compensation of the first input current and the second input current being performed by a four-quadrant input circuit, such as but not limited to any of the four-quadrant input circuits 422, 522, 602, 822, 902 and 1002 as described in this disclosure. In various examples, the one or more methods include the systems and circuits such as four-quadrant input circuits 422, 522, 602, 822, 902 and 1002 being operable to generate as an output a first differential voltage based on a difference in the current flows between the first input current and the second input current and to generate as an output from the four-quadrant input circuit a second differential voltage based on the difference in the current flows between the first input current and the second input current (1206). In various examples, the one or more system and circuit described herein are operable to generate a first output current based on the first differential voltage and generating a second output current based on the second differential voltage (1208). In various examples, generating the first output current and generating the second output current is performed by a four-quadrant input circuit, such as but not limited to any of the four-quadrant input circuits 422, 522, 602, 822, 902 and 1002 as described in this disclosure.

In various examples, the one or more methods include systems and circuits, such as four-quadrant input circuits 422, 522, 602, 822, 902 and 1002, operable to generate, at a summed current output node as summed current output comprising the first output current and the second output current (1210). In various examples, generating the summed current includes the summed current being representative of the difference in the current flows between the first input current and the second input current. In various examples, generating the summed current is performed by a first transconductance amplifier and a second transconductance amplifier, such as but not limited to any of OTAs 442, 446, 542, 546 as described in this disclosure. In various examples, generating the summed current is performed by a folded-cascode amplifier, such as but not limited to folded-cascode amplifier 840 as described in this disclosure.

In various examples, generating the summed current output further comprises coupling the summed current output to an input of an output stage and converting, using the output stage, the summed current output into a voltage level output, the voltage level output representative of a first data state or a second data state base on the difference in the current flow between the first current input and the second current input. In various examples, converting the summed current into a voltage level output is performed by an output stage, such as but not limited to any of output stages 460, 560, and 860 as described in this disclosure.

The techniques described herein may be implemented in hardware, firmware, or any combination thereof. The hardware may also execute software. Any features described as modules, units or components may be implemented together in an integrated logic device or separately as discrete but interoperable logic devices. In some cases, various features may be implemented as an integrated circuit device, such as an integrated circuit chip or chipset. If implemented in software, the techniques may be realized at least in part by a computer-readable storage medium comprising instructions that, when executed, cause a processor to perform one or more of the techniques described above.

Semiconductor or semiconductor device as described herein generally refers to a transistor (3-lead device) as would be understood by one or ordinal skill in the art. Semiconductor and semiconductor device as used herein is not limited to any particular type of transistor. In various examples, a semiconductor or semiconductor device as used herein refers to a Metal-Oxide-Semiconductor Field Effect Transistor (MOSFET) device. In various examples, semiconductor or semiconductor device refer to a MOSFET device that incorporates thin gate or ultra-thin gate construction.

In various examples, use of the word "coupled" or "coupling" refers to a direct coupling between lead or terminals of a device or electrical component by a conductor without intervening devices or electrical components, as would be understood by a person of ordinary skill in the art. In various examples, use of the word "coupled" or "coupling" refers to electrical coupling of devices or electrical components that may include coupling through one or more intervening devices or other electrical components, as would be understood by one of ordinary skill in the art.

A computer-readable storage medium may form part of a computer program product, which may include packaging materials. A computer-readable storage medium may comprise a computer data storage medium such as random access memory (RAM), synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates code in the form of instructions or data structures and that can be accessed, read, and/or executed by a computer.

The code or instructions may be executed by one or more processors, such as one or more DSPs, general purpose microprocessors, ASICs, field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated software modules or hardware modules. The disclosure also contemplates any of a variety of integrated circuit devices that include circuitry to implement one or more of the techniques described in this disclosure. Such circuitry may be provided in a single integrated circuit chip or in multiple, interoperable integrated circuit chips in a so-called chipset. Such integrated circuit devices may be used in a variety of applications.

The following example of methods, systems, and devices describe one or more aspects of the disclosure.

Example 1

A device comprising: a bus receiver comprising a four-quadrant input circuit, the four-quadrant input circuit including a first current input, a second current input, and a common mode current input, wherein the four-quadrant input circuit is configured to receive a first current at the first current input, receive a second current at the second current input, and receive a common mode current at the common mode current input, compensate the first current and the second current based on the common mode current, output a first differential voltage based on a difference in current flows between the first current and the second current compensated for the common mode current, and output a second differential voltage based on the difference in current flows between the first current and the second current compensated for the common mode current; and a gain stage coupled to the four-quadrant input circuit, wherein the gain stage is configured to receive the first differential voltage and the second differential voltage, generate a first current output based on the first differential voltage, generate a second current output based on the second differential voltage, and output a summed current comprising the first current output and the second current output.

Example 2

The device of example 1, wherein the four-quadrant input circuit further comprises: a first biasing circuit coupled to the common mode current input; a first semiconductor (PH) coupling the first current input to a voltage supply and operable to provide current to the first current input; and a second semiconductor (PL) coupling the second current input to the voltage supply and operable to provide current to the second current input, wherein the first biasing circuit is configured to determine that a negative current flow is occurring at the common mode current input, and when the negative current flow is occurring, bias the first semiconductor (PH) to provide current from the voltage supply to the first current input and bias the second semiconductor (PL) to provide current from the power supply to the second current input.

Example 3

The device of any of examples 1 and 2, wherein biasing the first semiconductor device (PH) comprises biasing the first semiconductor (PH) to provide a current flow to the first current input that matches the negative current flow occurring at the common mode current input, and biasing the second semiconductor (PL) comprises biasing the second semiconductor (PL) to provide a current flow to the second current input that matches the negative current flow occurring at the common mode current input.

Example 4

The device of any of examples 1-3, wherein the four-quadrant input circuit further comprises: a third semiconductor (NH) coupling the first current input to ground and operable to sink current from the first current input; and a fourth semiconductor (NL) coupling the second current input to ground and operable to sink current from the second current input, wherein the first biasing circuit is configured to determine that a positive current flow is occurring at the common mode current input, and wherein when the positive current flow is occurring, bias the third semiconductor (NH) to sink current from the first current input and bias the fourth semiconductor (NL) to sink current from the second current input.

Example 5

The device of examples 1-4, wherein biasing the third semiconductor (NH) comprises biasing the third semiconductor (NH) to sink a current flow from the first current input that matches the positive current flow occurring at the common mode current input, and wherein biasing the fourth semiconductor (NL) comprises biasing the fourth semiconductor (PL) to sink a current flow from the second current input that matches the positive current flow occurring at the common mode current input.

Example 6

The device of any of examples 1-5, wherein the four-quadrant input circuit further comprises: a first current source coupling the first current input to ground, the first current source operable to sink current from the first current input; and a second current source coupling the second current input to a voltage supply, the second current source operable to provide current from the voltage supply to the second current input, wherein the first current source is operable to sink any amount of current provided to the first current input up to a first threshold current level, and the second current source is operable to source current to the second current input so that the current level at the second current input is not less than the first threshold current level, and wherein the first threshold current level is set so that the first differential voltage and the second voltage differential provide a negative voltage differential when the difference between the current flow at the first current input and the second current input is less than the first threshold current level, and the first differential voltage and the second voltage differential provide a positive voltage differential when the difference between the current flow at the first current input and the second current input is greater than the first threshold current level.

Example 7

The device of examples 1-6, wherein the four-quadrant input circuit further comprises: a second biasing circuit comprising a series connected string of devices coupled between a voltage supply and ground; a first output semiconductor coupling the first current input to a first output of the four-quadrant input circuit; a second output semiconductor coupling the first current input to a second output of the four-quadrant input circuit; a third output semiconductor coupling to the second current input to a third output of the four-quadrant input circuit, and a fourth output semiconductor coupling the second current input to a fourth output of the four-quadrant input circuit, wherein the second biasing circuit is operable to provide a first output biasing voltage to the first output semiconductor and to the third output semiconductor, and a second output biasing voltage to the second output semiconductor and the fourth output semiconductor.

Example 8

The device of examples 1-7, wherein the second biasing circuit further comprises: a P-starve semiconductor coupling the voltage supply to the series connected string of devices; and an N-starve semiconductor coupling the series connected string of devices to ground; wherein the P-starve semiconductor and the N-starve semiconductor are operable to adjust a current flow through the series connected string of devices based on a change in an operating temperature of the four-quadrant input circuit and thereby adjust the first output biasing voltage and the second output biasing voltage to compensate for changes in the operating temperature.

Example 9

The device of examples 1-8, wherein the four-quadrant input circuit comprising one or more semiconductors comprising a thin-gate technology.

Example 10

The device of any of examples 1-9, wherein the gain stage comprises: a first transconductive amplifier operable to receive the first differential voltage provided by the four-quadrant input circuit and to provide an first gain stage output current based on the first differential voltage; a second transconductive amplifier operable to receive the second differential voltage provided by the four-quadrant input circuit, and to provide an second gain stage output current based on the second differential voltage; a summed current output node coupled to the first transconductive amplifier and to the second transconductive amplifier, wherein the summed current output node is operable to receive the first gain stage output current and the second gain stage output current, and provide the summed current output based on the first output current and to receive the second output current.

Example 11

The device of any of examples 1-9, wherein the first transconductive amplifier and the second transconductive amplifier are operable to source current to the summed current output node and to sink current from the summed current output node, and wherein when sourcing current to the summed current output node the first transconductive amplifier and the second transconductive amplifier are operable to provide a current flow representative of a first data state, and when sinking current from the summed current output node the first transconductive amplifier and the second transconductive amplifier are operable to sink a current flow representative of a second data state.

Example 12

The device of any of examples 1-11, further comprising: a voltage-to-current output stage, the voltage-to-current output stage coupled to the summed current output node, and operable to convert the summed current output to a voltage output representative of either the first data state or the second data state.

Example 13

A method comprising: receiving a first input current, a second input current, and a common mode current at a bus receiver including a four-quadrant input circuit; compensating, using the four-quadrant input circuit, the first input current and the second input current based on the received common mode current; generating as an output from the four-quadrant input circuit a first differential voltage based on a difference in the current flows between the first input current and the second input current; generating as an output from the four-quadrant input circuit a second differential voltage based on the difference in the current flows between the first input current and the second input current; generating a first output current based on the first differential voltage; generating a second output current based on the second differential voltage; generating, at a summed current output node, a summed current output comprising the first output current and the second output current, wherein the summed current is representative of the difference in the current flows between the first input current and the second input current.

Example 14

The method of example 13, wherein compensating the first input current and the second input current based on the received common mode current comprises: determining whether the common mode current is a negative current flow or a positive current flow; adding current to the first current input and to the second current input based on a determination that the common mode current is a negative current flow; and subtracting current from the first current flow and from the second current flow based on a determination that the common mode current is a positive current flow.

Example 15

The method of any of examples 13-14, further comprising: setting a threshold voltage output level for a first output and a second output of the four-quadrant input circuit, comprising coupling a first current source to a first input of the four-quadrant input circuit that is receiving the first input current, and sinking to ground, using the first current source, all current levels that are less than a first threshold current level that are received at the first input of the four-quadrant; setting a threshold voltage output level for a third output and a fourth output of the four-quadrant input circuit, comprising coupling a second current source to a second input of the four-quadrant input circuit that is receiving the second input current, and sourcing from a voltage source, using the second current source, a current that provides at least a current level equal to the first threshold current level.

Example 16

The method of examples 13-15, further comprising: generating a first biasing voltage and a second biasing voltage;

biasing a first output semiconductor and a second output semiconductor to control a current flow from of the first input current to a first output and a second output of the four-quadrant input circuit using the first biasing voltage; biasing a third output semiconductor and a fourth output semiconductor to control a current flow from the second input current to a third output and a fourth output of the four-quadrant input circuit; starving a biasing current used to generate the first biasing voltage and the second biasing voltage to compensate for changes in biasing due to temperature changes in an operating environment of the four-quadrant input circuit.

Example 17

The method of examples 13-16, wherein generating the first output current based on the first differential voltage comprises applying the first differential voltage to the inputs of a first transconductance amplifier; and receiving the first output current generated at the output of the first transconductance amplifier, and wherein generating the second output current based on the second differential voltage comprises applying the second differential voltage to the inputs of a second transconductance amplifier, and receiving the second output current generated at the output of the second transconductance amplifier.

Example 18

The method of any of examples 13-17, further comprising: summing the first current output and the second current output to provide a summed current output, the current flow of the summed current output representative of a first data state or a second data state based on a difference in current flows between the first current input and the second current input.

Example 19

The method of any of examples 13-18, further comprising: coupling the summed current output to an input of an output stage; and converting, using the output stage, the summed current output into a voltage level output, wherein the voltage level output is representative of a first data state or a second data state based on the difference in the current flow between the first current input and the second current input.

Example 20

A system comprising: a bus receiver comprising a four-quadrant input circuit, the four-quadrant input circuit including a first current input and a second current input; wherein the four-quadrant input circuit is configured to receive a first current at the first current input, receive a second current at the second current input, and output a first differential voltage and a second differential voltage based on a difference in current flows between the first current and the second current, the first differential voltage and the second differential voltage compensated for a common mode current; an active gain input stage coupled to the four-quadrant input circuit, the active gain input stage comprising: a first input coupled to a voltage input differential circuit; a second input coupled to a biasing circuit operable to provide biasing to control biasing of a plurality of output semiconductors controlling a plurality of outputs of the four-quadrant input circuit; a first active gain stage output coupled to the biasing circuit; and a second active gain stage output coupled to the biasing circuit, wherein the active gain stage is operable to provide common mode current compensation by driving, using the first active gain output, the biasing circuit to allow current to be provided to the first current input and the second current input when a negative common mode current exists at the first current input and the second current input; and provide common mode current compensation by driving, using the second active gain output, the biasing circuit to allow current to be sunk from the first current input and from the second current input when a positive common mode current exists at the first current input and the second current input.

Example 21

The system of example 20, further comprising: a gain stage coupled to the four-quadrant input circuit; wherein the gain stage is configured to receive the first differential voltage and the second differential voltage, generate a first current output based on the first differential voltage, generate a second current output based on the second differential voltage, and provide a summed current output comprising the first current output and the second current output.

Example 22

The system of any of examples 20 and 21, further comprising: a current-to-voltage conversion stage; wherein the current-to-voltage conversion stage is coupled to the summed current output node, and is operable to convert the summed current output to a voltage output representative of either the first data state or the second data state based the difference in current flows between the first current and the second current.

Various examples have been described. These and other examples are within the scope of the following claims.

What is claimed is:
1. A device comprising:
a bus receiver comprising a four-quadrant input circuit, the four-quadrant input circuit including a first current input, a second current input, and a common mode current input,
wherein the four-quadrant input circuit is configured to receive a first current at the first current input, receive a second current at the second current input, and receive a common mode current at the common mode current input, compensate the first current and the second current based on the common mode current, output a first differential voltage based on a difference in current flows between the first current and the second current compensated for the common mode current, and output a second differential voltage based on the difference in current flows between the first current and the second current compensated for the common mode current; and
a gain stage coupled to the four-quadrant input circuit, the gain stage comprising a first transconductive amplifier operable to receive the first differential voltage provided by the four-quadrant input circuit and to provide a first gain stage output current based on the first differential voltage and a second transconductive amplifier operable to receive the second differential voltage provided by the four-quadrant input circuit, and to provide an second gain stage output current based on the second differential voltage;

a summed current output node coupled to the first transconductive amplifier and to the second transconductive amplifier, wherein the summed current output node is operable to receive the first gain stage output current and the second gain stage output current, and provide the summed current output based on the first output current and the second output current;

wherein the gain stage is configured to receive the first differential voltage and the second differential voltage, generate a first current output based on the first differential voltage, generate a second current output based on the second differential voltage, and output a summed current comprising the first current output and the second current output.

2. The device of claim 1, wherein the four-quadrant input circuit further comprises:

a first biasing circuit coupled to the common mode current input;

a first semiconductor (PH) coupling the first current input to a voltage supply and operable to provide current to the first current input; and a second semiconductor (PL) coupling the second current input to the voltage supply and operable to provide current to the second current input, wherein the first biasing circuit is configured to determine that a negative current flow is occurring at the common mode current input, and when the negative current flow is occurring, bias the first semiconductor (PH) to provide current from the voltage supply to the first current input and bias the second semiconductor (PL) to provide current from the power supply to the second current input.

3. The device of claim 2, wherein biasing the first semiconductor device (PH) comprises biasing the first semiconductor (PH) to provide a current flow to the first current input that matches the negative current flow occurring at the common mode current input, and biasing the second semiconductor (PL) comprises biasing the second semiconductor (PL) to provide a current flow to the second current input that matches the negative current flow occurring at the common mode current input.

4. The device of claim 2, wherein the four-quadrant input circuit further comprises:

a third semiconductor (NH) coupling the first current input to ground and operable to sink current from the first current input; and a fourth semiconductor (NL) coupling the second current input to ground and operable to sink current from the second current input, wherein the first biasing circuit is configured to determine that a positive current flow is occurring at the common mode current input, and wherein when the positive current flow is occurring, bias the third semiconductor (NH) to sink current from the first current input and bias the fourth semiconductor (NL) to sink current from the second current input.

5. The device of claim 4, wherein biasing the third semiconductor (NH) comprises biasing the third semiconductor (NH) to sink a current flow from the first current input that matches the positive current flow occurring at the common mode current input, and Wherein biasing the fourth semiconductor (NL) comprises biasing the fourth semiconductor (PL) to sink a current flow from the second current input that matches the positive current flow occurring at the common mode current input.

6. The device of claim 1, wherein the four-quadrant input circuit further comprises:

a first current source coupling the first current input to ground, the first current source operable to sink current from the first current input; and a second current source coupling the second current input to a voltage supply, the second current source operable to provide current from the voltage supply to the second current input, wherein the first current source is operable to sink any amount of current provided to the first current input up to a first threshold current level, and the second current source is operable to source current to the second current input so that the current level at the second current input is not less than the first threshold current level, and wherein the first threshold current level is set so that the first differential voltage and the second voltage differential provide a negative voltage differential when the difference between the current flow at the first current input and the second current input is less than the first threshold current level, and the first differential voltage and the second voltage differential provide a positive voltage differential when the difference between the current flow at the first current input and the second current input is greater than the first threshold current level.

7. The device of claim 1, wherein the four-quadrant input circuit further comprises:

a second biasing circuit comprising a series connected string of devices coupled between a voltage supply and ground;

a first output semiconductor coupling the first current input to a first output of the four-quadrant input circuit;

a second output semiconductor coupling the first current input to a second output of the four-quadrant input circuit;

a third output semiconductor coupling to the second current input to a third output of the four-quadrant input circuit; and a fourth output semiconductor coupling the second current input to a fourth output of the four-quadrant input circuit, wherein the second biasing circuit is operable to provide a first output biasing voltage to the first output semiconductor and to the third output semiconductor, and a second output biasing voltage to the second output semiconductor and the fourth output semiconductor.

8. The device of claim 7, wherein the second biasing circuit further comprises:

a P-starve semiconductor coupling the voltage supply to the series connected string of devices; and an N-starve semiconductor coupling the series connected string of devices to ground;

wherein the P-starve semiconductor and the N-starve semiconductor are operable to adjust a current flow through the series connected string of devices based on a change in an operating temperature of the four-quadrant input circuit and thereby adjust the first output biasing voltage and the second output biasing voltage to compensate for changes in the operating temperature.

9. The device of claim 1, wherein the four-quadrant input circuit comprising one or more semiconductors comprising a thin-gate technology.

10. The device of claim 1,
wherein the first transconductive amplifier and the second transconductive amplifier are operable to source current to the summed current output node and to sink current from the summed current output node, and
wherein when sourcing current to the summed current output node the first transconductive amplifier and the second transconductive amplifier are operable to provide a current flow representative of a first data state, and when sinking current from the summed current output node the first transconductive amplifier and the second transconductive amplifier are operable to sink a current flow representative of a second data state.

11. The device of claim 10, further comprising:
a voltage-to-current output stage, the voltage-to-current output stage coupled to the summed current output node, and operable to convert the summed current output to a voltage output representative of either the first data state or the second data state.

12. A method comprising:
receiving a first input current, a second input current, and a common mode current at a bus receiver including a four-quadrant input circuit;
compensating, using the four-quadrant input circuit, the first input current and the second input current based on the received common mode current;
generating as an output from the four-quadrant input circuit a first differential voltage based on a difference in the current flows between the first input current and the second input current;
generating as an output from the four-quadrant input circuit a second differential voltage based on the difference in the current flows between the first input current and the second input current;
generating a first output current based on the first differential voltage comprising applying the first differential voltage to the inputs of a first transconductance amplifier and receiving the first output current generated at the output of the first transconductance amplifier,
generating a second output current based on the second differential voltage comprising applying the second differential voltage to the inputs of a second transconductance amplifier, and receiving the second output current generated at the output of the second transconductance amplifier; and
generating, at a summed current output node, a summed current output comprising the first output current and the second output current, wherein the summed current is representative of the difference in the current flows between the first input current and the second input current.

13. The method of claim 12, wherein compensating the first input current and the second input current based on the received common mode current comprises:
determining whether the common mode current is a negative current flow or a positive current flow;
adding current to the first current input and to the second current input based on a determination that the common mode current is a negative current flow; and
subtracting current from the first current flow and from the second current flow based on a determination that the common mode current is a positive current flow.

14. The method of claim 12, further comprising:
setting a threshold voltage output level for a first output and a second output of the four-quadrant input circuit, comprising coupling a first current source to a first input of the four-quadrant input circuit that is receiving the first input current, and sinking to ground, using the first current source, all current levels that are less than a first threshold current level that are received at the first input of the four-quadrant;
setting a threshold voltage output level for a third output and a fourth output of the four-quadrant input circuit, comprising coupling a second current source to a second input of the four-quadrant input circuit that is receiving the second input current, and sourcing from a voltage source, using the second current source, a current that provides at least a current level equal to the first threshold current level.

15. The method of claim 12, further comprising:
generating a first biasing voltage and a second biasing voltage;
biasing a first output semiconductor and a second output semiconductor to control a current flow from of the first input current to a first output and a second output of the four-quadrant input circuit using the first biasing voltage;
biasing a third output semiconductor and a fourth output semiconductor to control a current flow from the second input current to a third output and a fourth output of the four-quadrant input circuit;
starving a biasing current used to generate the first biasing voltage and the second biasing voltage to compensate for changes in biasing due to temperature changes in an operating environment of the four-quadrant input circuit.

16. The method of claim 12, further comprising:
summing the first current output and the second current output to provide a summed current output, the current flow of the summed current output representative of a first data state or a second data state based on a difference in current flows between the first current input and the second current input.

17. The method of claim 16, further comprising:
coupling the summed current output to an input of an output stage; and
converting, using the output stage, the summed current output into a voltage level output, wherein the voltage level output is representative of a first data state or a second data state based on the difference in the current flow between the first current input and the second current input.

18. A system comprising:
a bus receiver comprising a four-quadrant input circuit, the four-quadrant input circuit including a first current input and a second current input;
wherein the four-quadrant input circuit is configured to receive a first current at the first current input, receive a second current at the second current input, and output a first differential voltage and a second differential voltage based on a difference in current flows between the first current and the second current, the first differential voltage and the second differential voltage compensated for a common mode current;
an active gain input stage coupled to the four-quadrant input circuit, the active gain input stage comprising a first input coupled to a voltage input differential circuit;
a second input coupled to a biasing circuit operable to provide biasing to control biasing of a plurality of output semiconductors controlling a plurality of outputs of the four-quadrant input circuit; a first active gain stage output coupled to the biasing circuit; and a second active gain stage output coupled to the biasing circuit, wherein the active gain stage is operable to provide common mode current compensation by driving, using the first active gain output, the biasing circuit to allow current to be provided to the first current input and the second current input when a negative common mode current exists at the first current input and the second current input; and provide common mode current compensation by driving, using the second active gain output, the biasing circuit to allow current to be sunk from the first current input and from the second current input when a positive common mode current exists at the first current input and the second current input; and a gain stage coupled to the four-quadrant input circuit, wherein the gain stage is configured to receive the first differential voltage and the second differential voltage, generate a first current output based on the first differential voltage, generate a second current output based on the second differential voltage, and provide a summed current output comprising the first current output and the second current output.

19. The system of claim 18, further comprising:

a current-to-voltage conversion stage, wherein the current-to-voltage conversion stage is coupled to the summed current output node, and is operable to convert the summed current output to a voltage output representative of either the first data state or the second data state based the difference in current flows between the first current and the second current.

* * * * *